United States Patent [19]

Sakai et al.

[11] Patent Number: 5,717,302
[45] Date of Patent: Feb. 10, 1998

[54] MOTOR STOPPED VERIFICATION APPARATUS

[75] Inventors: Masayoshi Sakai; Toshihito Shirai, both of Saitama-ken; Hiroji Anzai, Tochigi-ken; Koichi Futsuhara, Saitama-ken, all of Japan

[73] Assignee: The Nippon Signal Co., Ltd., Tokyo, Japan

[21] Appl. No.: 647,919

[22] PCT Filed: Sep. 30, 1994

[86] PCT No.: PCT/JP94/01647

§ 371 Date: May 29, 1996

§ 102(e) Date: May 29, 1996

[87] PCT Pub. No.: WO96/10750

PCT Pub. Date: Apr. 11, 1996

[51] Int. Cl.⁶ .................. G01P 13/00; H02P 6/24
[52] U.S. Cl. .............. 318/374; 318/282; 318/254; 318/439; 340/648
[58] Field of Search .................. 318/138, 139, 318/245, 254, 280, 283, 289, 293, 430–439, 370–379, 757; 340/648, 635, 679; 361/115, 93, 87; 324/158.1, 51, 510

[56] References Cited

U.S. PATENT DOCUMENTS

| | | | |
|---|---|---|---|
| 4,105,903 | 8/1978 | Shaw et al. | 307/328 |
| 4,236,604 | 12/1980 | Warner | 186/61 |
| 4,661,880 | 4/1987 | Futsuhara | 361/93 |
| 4,734,673 | 3/1988 | Murata et al. | 340/52 R |
| 4,926,101 | 5/1990 | Enomoto et al. | 318/374 |
| 4,977,375 | 12/1990 | Toth | 324/511 |
| 5,027,114 | 6/1991 | Kawashima et al. | 340/941 |
| 5,493,188 | 2/1996 | Yoshikawa et al. | 318/254 |
| 5,568,131 | 10/1996 | Sakai et al. | 340/648 |
| 5,619,110 | 4/1997 | Sugimoto et al. | 318/450 |

FOREIGN PATENT DOCUMENTS

| | | |
|---|---|---|
| 1-23006 | 4/1989 | Japan. |
| WO94/23303 | 10/1994 | WIPO. |

*Primary Examiner*—Paul Ip
*Attorney, Agent, or Firm*—Finnegan, Henderson, Farabow, Garrett & Dunner, L.L.P.

[57] ABSTRACT

The invention relates to a motor stopped verification apparatus for verifying if a motor has stopped rotating, and in particular to rotation sensor technology for sampling rotation signals from a motor. With a first aspect of the invention, a high frequency current signal is supplied to the winding of a tachometer generator incorporated in a motor. This high frequency signal is modulated by an output signal from the tachometer generator, and the modulated signal made a motor rotation detection output from a rotation sensor. With a second aspect of the invention, a transducer coil is utilized as a part of an oscillator, and the motor rotation is converted to a change in the oscillation frequency of the oscillator and then sampled. With a third aspect of the invention, the motor rotation is converted by means of a resonance circuit incorporating the transducer coil, into a change in terminal voltage of the resonance circuit and then sampled.

16 Claims, 19 Drawing Sheets

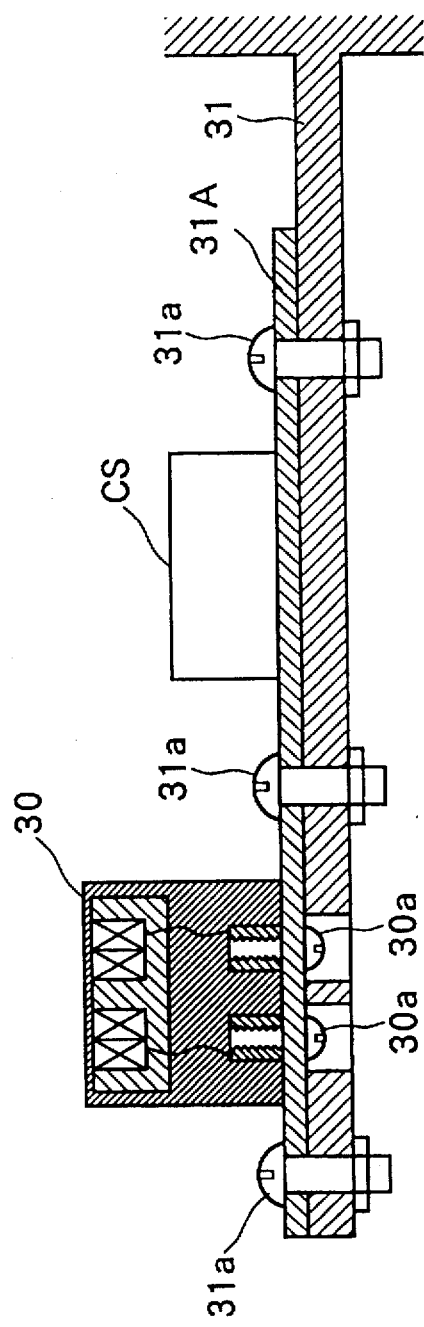

MOTOR STOPPED VERIFICATION APPARATUS

TECHNICAL FIELD

The present invention relates to a fail-safe motor stopped verification apparatus which can verify if a motor has stopped rotating by reliably distinguishing between a motor rotating condition (including rotation under inertia) and a motor stopped condition. In particular the invention relates to technology for rotation sensors for sampling motor rotating and stopped detection outputs.

BACKGROUND ART

Heretofore, to ensure operator safety when using motor driven apparatus, it has been necessary to have a safety device which can detect a sudden unintentional start up of a stopped motor, and give a warning. As such a safety device, the present applicant has proposed (refer to PCT/JP93/00411) a motor stopped verification apparatus having a high degree of safety, which can reliably detect that a motor has stopped rotating (including rotation under inertia) and which has excellent fail-safe characteristics at the time of a fault in the apparatus.

The operation of such a rotation stopped verification apparatus is described hereunder.

With this apparatus, the construction includes a sensor section (rotation sensor) incorporating a bridge circuit having a transducer coil on one side for converting a motor rotating or stopped condition into an electrical signal, which converts a detection output for the rotation or non-rotation of motor into a change in the imbalance output signal (alternating current signal) of the bridge circuit and outputs, and a rotation judgement circuit incorporating a fail-safe window comparator, previously known for example from U.S. Pat. No. 4,661,880, wherein a logical value output from the window comparator based on the detection output from the sensor section, is made a judgement output for the rotation or non-rotation of motor.

In this judgement operation, the detection output from the sensor becomes constant when the motor is stopped. When this constant level detection output is input from the sensor section to the rotation judgement circuit, an output signal of logic value "1" indicating that the motor has stopped (corresponding to the safe condition) is generated from the window comparator of the rotation judgement circuit. On the other hand, when the motor is rotating (including rotation under inertia) the detection output from the sensor changes periodically corresponding to the rotation. When this periodically changing detection output is input from the sensor section to the rotation judgement circuit, an output signal of logic value "0" indicating that the motor is rotating (corresponding to a danger condition) is generated from the window comparator of the rotation judgement circuit. Furthermore the construction is fail-safe in that, if a fault occurs in the sensor section or the rotation judgement circuit, the output from the window comparator becomes a logic value "0" indicating danger.

However, with the rotation stopped verification apparatus of the conventional technology, since a bridge circuit is used in the sensor section the following problems arise:

One problem is that when a motor exciting winding is used as the transducer coil connected to the one side of the bridge circuit, then the impedance of the exciting winding differs depending on the motor used. Moreover, when a pick-up coil for detecting rotation of the motor from changes due to recesses and protrusions around the periphery of a motor driven metal rotation body is used as the transducer coil, then the size of the pick-up coil differs depending on the shape of the metal rotation body. Therefore, an adjustment is necessary for appropriately setting the imbalance output signal from the bridge circuit each time there is a change in the detection object being used for detecting the rotation or non-rotation. That is to say, it is necessary to adjust the imbalance output signal level of the bridge circuit to match the detection object, so that the imbalance output signal level is within the range (window) of the upper limit and lower limit threshold values of the window comparator when the motor is stopped, and falls outside of this window when the motor is rotating or at the time of a fault. This requires amplitude adjustment of the imbalance output signal (adjustment of the resistance value on one side of the bridge circuit), and phase adjustment (adjustment of the capacity of the resonance capacitor).

Another problem is that in the case of multiple faults, a situation is possible wherein the output from the window comparator becomes a logic value of "1". More specifically, when a bridge circuit is used in the sensor section, if a disconnection fault or a short circuit fault occurs in an element on one side of the bridge circuit, then a high level imbalance output signal occurs. When such a single fault occurs in the bridge circuit, an upper limit threshold value is required in the window comparator to detect this. Moreover, since the imbalance output signal of the bridge circuit at normal times is of a low level, then an amplifier is required to amplify this. The amplifier must however have the characteristic that the amplified output drops at the time of a fault, to ensure that an output within the upper and lower limit threshold values of the window comparator is not produced at the time of a fault. If at the time of a fault in the amplifier an output within the window of the window comparator is produced, then the window comparator will not be able to detect this single amplifier fault, and hence this will not be fail-safe.

Therefore if overlapping multiple faults in the bridge circuit and in the amplifier occur, then due to the effect of a level drop of the amplifier offsetting a high level output from the bridge circuit, the output level from the amplifier can come within the upper and lower limit threshold values of the window comparator. There is thus the possibility of the window comparator giving an output of logic value "1" indicating safety (motor stopped) in spite of there being a fault in the apparatus.

The present invention takes into consideration the above situation with the object of providing a motor stopped verification apparatus, having a construction wherein a bridge circuit is not used in the rotation sensor for producing detection outputs for the rotation or non-rotation of motor, thereby avoiding the requirement for complicated adjustment even if the detection object is changed, and which can maintain fail-safe characteristics at the time of multiple faults where faults in the rotation sensor and an amplifier occur at the same time, even if the amplifier is used for amplifying the detection output from the rotation sensor.

DISCLOSURE OF THE INVENTION

The motor stopped verification apparatus according to a first aspect of the invention comprises; a rotation sensor which produces an output signal corresponding to a motor rotating or stopped condition, a fail-safe rotation judgement circuit which generates an output of logic value "1" under the motor stopped condition and an output of logic value "0"

under the motor rotating condition, based on an output signal from the rotation sensor, and which generates an output of logic value "0" at the time of a fault, the rotation judgement circuit including a first rectifying circuit into which an alternating current signal produced from the rotation sensor corresponding to the motor rotating or stopped condition is input and rectified, a high frequency signal generating device for generating a high frequency signal for being superimposed on an output signal from the first rectifying circuit, an amplifying device which amplifies the output signal which has been superimposed with the high frequency signal and is saturated at the level of the rotation sensor output signal for when the motor is rotating, a capacitor interposed between the high frequency signal generating device and the amplifying device, for transmitting the output signal from the first rectifying circuit which has been superimposed with the high frequency signal to the amplifying device, a second rectifying circuit for rectifying the output from the amplifying device, and a two input window comparator having a first input terminal for direct input of the output signal from the first rectifying circuit which has been superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein the rotation sensor is constructed such that a high frequency current signal is supplied to the windings of a tachometer generator incorporated in the motor, and modulated by an output signal from the tachometer generator, and the modulated signal is transmitted to the rotation judgement circuit as the output signal corresponding to the motor rotating or stopped condition.

If as with this construction a tachometer generator incorporated in the motor is used, then a motor rotation detection output can be sampled without using a bridge circuit in the rotation sensor. Therefore, even if the detection object (i.e. the motor) is changed, it is not necessary to carry out the troublesome output adjustment of the rotation sensor. Moreover, compared to the rotation sensor using a bridge circuit, a higher level detection output can be generated so that an amplifier for amplifying the detection output of the rotation sensor is not required. It is therefore not necessary to consider the problem attributable to a double fault with the rotation sensor and the amplifier faulting at the same time.

The basic construction of the rotation sensor according to claim 2 includes; an alternating current signal generating device for generating a high frequency alternating current signal, a first transformer with a secondary winding connected in series to a tachometer generator winding, and a primary winding connected to the alternating current signal generating device, and a current—voltage conversion device for converting a current signal flowing in the series circuit of the secondary winding of the first transformer and the winding of the tachometer generator, into a voltage signal, and transmitting this to the rotation judgement circuit.

Here the current—voltage conversion device may be a resistance element inserted in series in the series circuit of the windings of the first transformer and the tachometer generator. Moreover this may comprise a second transformer with a primary winding inserted in series in the series circuit of the windings of the first transformer and the tachometer generator, and with an output signal from a secondary winding input to the rotation judgement circuit. When a second transformer is used, then the core of at least one of the first and the second transformers is made from a saturable magnetic body.

With the construction using a transformer, then only the lower limit of the threshold value of the window comparator of the rotation judgement circuit is required. Moreover there is the effect that the rotation sensor side is isolated by the transformer from the rotation judgement circuit side which includes the electronic circuits.

The rotation judgement circuit may be provided with a fail-safe on-delay circuit which delays the output from the two input window comparator by a predetermined delay time before output, and which does not erroneously shorten the delay time at the time of a fault.

By providing an on-delay circuit with the construction using the transformer, the window comparator output of logic value "1", which is generated intermittently at the time of motor rotation can be masked. Hence the reliability of the rotation judgement circuit can be improved.

The motor stopped verification apparatus according to a second aspect of the invention comprises the rotation sensor and the rotation judgement circuit according to claim 1, with the rotation sensor comprising; a coil with an inductance which changes in accordance with the rotation or non-rotation of the motor, an oscillating circuit including the coil and a capacitor constituting a resonance circuit wherein the oscillation frequency changes in accordance with the change in inductance of the coil, and a frequency—voltage converting circuit for convening the frequency of the oscillating circuit into a voltage, and transmitting this to the rotation judgement circuit.

In this case, the motor rotation is converted to a frequency change and sampled, and the frequency is converted to a voltage. With such a construction, if the detection object (motor) is changed, adjustment can be easily carried out by merely adjusting the capacity of the capacitor in the oscillating circuit, so that compared to the rotation sensor using a bridge circuit, there are fewer adjustment elements. Moreover, an amplifier for amplifying the output from the rotation sensor is not required.

The motor stopped verification apparatus according to a third aspect of the invention comprises; a rotation sensor which produces an output signal corresponding to a motor rotating or stopped condition, and a fail-safe rotation judgement circuit which generates an output of logic value "1" under the motor stopped condition and an output of logic value "0" under the motor rotating condition, based on an output signal from the rotation sensor, and which generates an output of logic value "0" at the time of a fault, the rotation judgement circuit including; a first amplifying device for amplifying the alternating current signal produced from the rotation sensor corresponding to the motor rotating or stopped condition, a first rectifying circuit for rectifying the amplified output from the first amplifying device, a high frequency signal generating device for generating a high frequency signal for being superimposed on an output signal from the first rectifying circuit, a second amplifying device which amplifies the output signal superimposed with the high frequency signal and is saturated at the level of the rotation sensor output signal for when the motor is rotating, a capacitor interposed between the high frequency signal generating device and the second amplifying device, for transmitting the output signal from the first rectifying circuit which has been superimposed with the high frequency signal to the second amplifying device, a second rectifying circuit for rectifying the output from the second amplifying device, and a two input window comparator having a first input terminal for direct input of the output signal from the first rectifying circuit which is superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein the rotation sensor has a resonance circuit comprising a capacitor and a transducer coil with an inductance which changes in accordance with the rotation or non-rotation of motor, and an alternating current signal generating device for supplying an alternating current signal to the resonance circuit, and is constructed such that a terminal voltage signal of the resonance circuit which changes with rotation of the motor is transmitted to the rotation judgement circuit as the output signal corresponding to the motor rotating or stopped condition.

With such a construction, even in the case wherein a fault occurs in the rotation sensor so as to increase the output level and at the same time a fault occurs in the amplifier which amplifies the output from the rotation sensor, since the amount of rise in the output from the rotation sensor is small compared to that for the case of a bridge circuit, the output from the amplifier can be kept to a lower level than the lower limit threshold value of the window comparator.

With the basic construction of the transducer coil, this may be housed in a coil housing case secured to an attachment member located close to a metal rotation body driven by a motor, and located so as to face at a predetermined distance, recesses/protrusions formed at even spacing around the periphery of the metal rotation body.

Moreover, if the construction is such that at least one of the signal transmitting elements other than the transducer coil constituting the rotation sensor is housed in a different housing case to the coil housing case to be secured to the attachment member, then if the transducer coil is not positively fixed to the attachment member, the rotation sensor will not operate normally. Consequently, poor quality interference with the transducer coil not being attached in the vicinity of the metal rotation body to be observed, but being attached close to another metal rotation body can be prevented.

If the transducer coil is structured as a transformer with a primary and a secondary coils, then the construction may be such that only a lower limit threshold value is provided in the window comparator.

If the construction is such that a low pass filter is provided between the rotation sensor and the rotation judgement circuit, then with a transducer coil structure wherein the primary coil and secondary coil are loose coupled so that the receiving level of the secondary coil is low, then even if the frequency selection characteristic of the secondary coil are lost with the occurrence of a disconnection fault in the capacitor constituting the resonance circuit, high frequency noise can be eliminated, so that the reliability of the rotation stopped verification apparatus can be increased.

Moreover, if a motor operation permit signal generating circuit is provided comprising; a filter circuit for taking the output signal from the second amplifying device of the rotation judgement circuit, and eliminating the high frequency signal component which has been superimposed on the output signal, a third rectifying circuit for rectifying the output from the filter circuit, and a fail safe first AND gate with the electrical signal to the motor input to one input terminal and the rectified output from the third rectifying circuit input to the other input terminal, which generates an output of logic value "1" when the input signal levels of both input terminals are both higher than a predetermined threshold value and which gives an output of logic value "0" at the time of a fault, with the output signal of logic value "1" from the first AND gate made a motor operation continuation permit signal, then under conditions wherein the transducer coil of the rotation sensor is far removed from the metal rotation body so that the rotation of the metal rotation body cannot be observed, the rotation of the motor can be promptly stopped thus ensuring operator safety.

Furthermore, if a motor operation permit signal generating circuit is provided comprising; a filter circuit for taking the output signal from the second amplifying device of the rotation judgement circuit, and eliminating the high frequency signal component which has been superimposed on the output signal, a third rectifying circuit for rectifying the output from the filter circuit, a fail safe first AND gate with the electrical signal to the motor input to one input terminal and the rectified output from the third rectifying circuit input to the other input terminal, which generates an output of logic value "1" when the input signal levels of both input terminals are both higher than a predetermined threshold value and which gives an output of logic value "0" at the time of a fault, and a fail safe second AND gate with the output signal from the first AND gate input to one input terminal and the output signal from the first rectifying circuit of the rotation judgement circuit input to the other input terminal, which generates an output of logic value "1" when the input signal levels of both input terminals are both higher than a predetermined threshold value and which gives an output of logic value "0" at the time of a fault, with the output signal of logic value "1" from the second AND gate made a motor operation continuation permit signal, then the rotation of the motor can be promptly stopped, not only in the case wherein the transducer coil is far removed from the metal rotation body but also in the case wherein this is abnormally close to the metal rotation body, so that operator safety can be increased to an even higher level.

If the construction is such that an on-delay circuit having a predetermined delay time is connected to the output side of the filter circuit, with an output signal of logic value "1" from the on-delay circuit made a rotation decreased signal, then for example if a light emitting diode or the like is connected to this rotation decreased output, then when the motor rotation has decreased to a rotation speed which is safe even for a nearby operator, this can be notified with the light emitting diode, so that inspection etc. under the rotating condition of the motor is possible.

The motor stopped verification apparatus according to a fourth aspect of the invention comprises; a rotation sensor which produces an output signal corresponding to the motor rotating or stopped condition, a fail-safe rotation judgement circuit which generates an output of logic value "1" under the motor stopped condition and an output of logic value "0" under the motor rotating condition, based on an output signal from the rotation sensor, and which generates an output of logic value "0" at the time of a fault, the rotation judgement circuit including a first rectifying circuit into which an alternating current signal produced from the rotation sensor corresponding to the motor rotating or stopped condition is input and rectified, a high frequency signal generating device for generating a high frequency signal for being superimposed on an output signal from the first rectifying circuit, an amplifying device which amplifies the output signal which has been superimposed with the high frequency signal and is saturated at the level of the rotation sensor output signal for when the motor is rotating,, a capacitor interposed between the high frequency signal generating device and the amplifying device, for transmitting the output signal of the first rectifying circuit which has been superimposed with the high frequency signal to the amplifying device, a second rectifying circuit for rectifying the output from the amplifying device, and a two input window comparator having a first input terminal for direct input of the output signal from the first rectifying circuit which has been superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein a motor operation permit signal generating circuit is provided comprising; a filter circuit for taking the output signal from the amplifying device of the rotation judgement circuit, and eliminating the high frequency signal component which has been superimposed on the output signal, a third rectifying circuit for rectifying the output from the filter circuit, and a fail safe first AND gate with the electrical signal to the motor input to one input terminal and the rectified output from the third rectifying circuit input to the other input terminal, which generates an output of logic value "1" when the input signal levels of both input terminals are both higher than a predetermined threshold value and which gives an output of logic value "0" at the time of a fault, with the output signal of logic value "1" from the first AND gate made a motor operation continuation permit signal, In this way, even in the case of mechanical equipment wherein rotation is seldom stopped, it is possible to immediately warn of a sensor fault when the sensor faults,

BRIEF DESCRIPTION OF THE DRAWINGS

FIG. 24 shows a preferred example of an attachment arrangement of the transducer coil;

BEST MODE FOR CARRYING OUT THE INVENTION

As follows is a detailed description of embodiments of the present invention with reference to the drawings.

Figure 1:
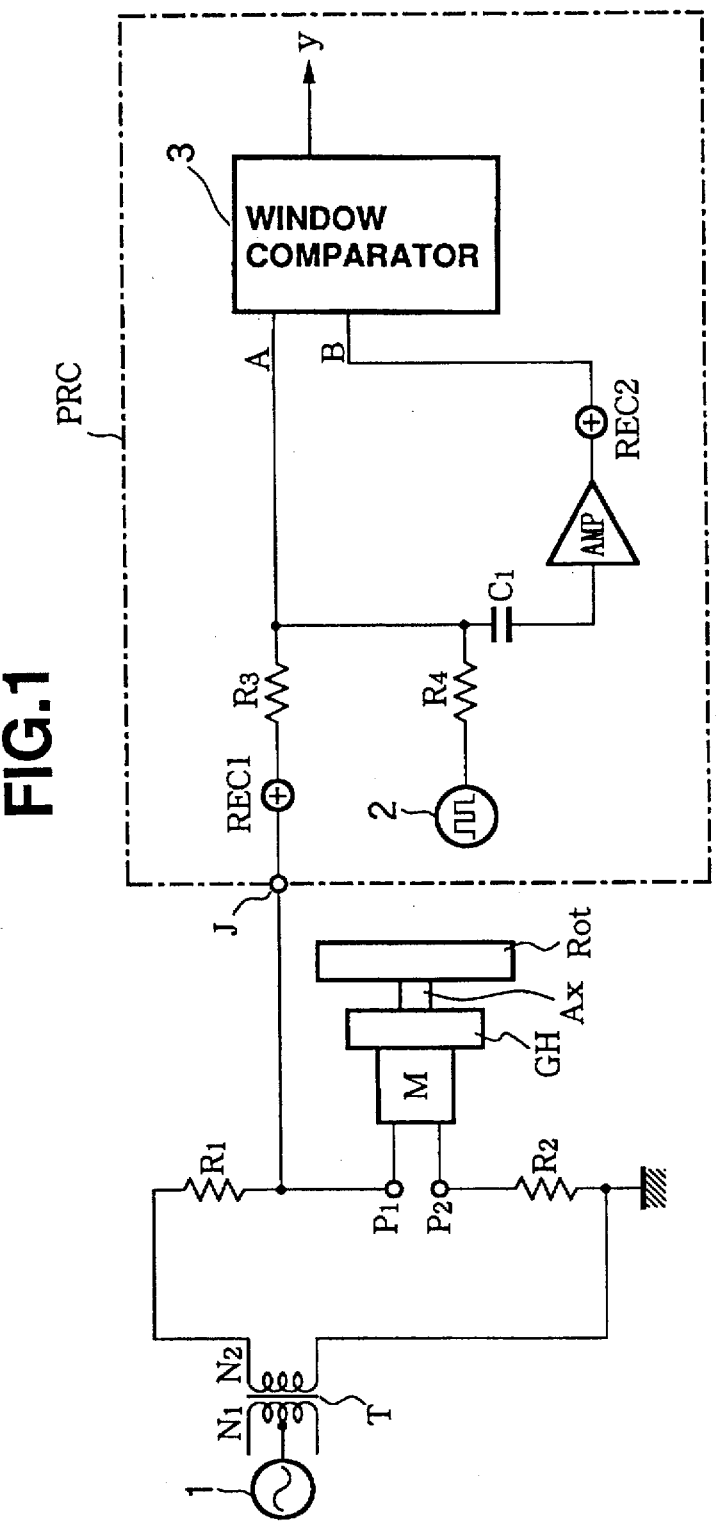
FIG. 1 is a circuit diagram illustrating a first embodiment of a motor stopped verification apparatus according to a first aspect of the present invention.

FIG. 1 shows a circuit diagram of a first embodiment of a motor rotation stopped verification apparatus according to a first aspect of the invention, which uses a tachometer generator.

In FIG. 1, a motor M which is the object to be detected by the apparatus, rotationally drives a movable body Rot via a gear head GH and a rotation shaft Ax, and is fitted internally with a tachometer generator. Output terminals P1, P2 of the tachometer generator are connected to a series circuit of resistors R1, R2 and a secondary winding N2 of a first transformer T. An alternating current signal generator 1 outputs a high frequency alternating current signal to a primary winding N1 of the transformer T, and this alternating current output signal is supplied to the output terminals P1, P2 of the tachometer generator via the secondary winding N2 of the transformer T, as a current signal. Here the rotation sensor of the present embodiment comprises the alternating current signal generator 1, the transformer T, the resistors R1, R2 and the tachometer generator.

A motor rotating/stopped detection output from the rotation sensor is output as a voltage signal from between the resistor R1 and the output terminal P1, and input to a sensor signal input terminal J of a motor rotation judgement circuit PRC. Accordingly the resistor R1 has the function of a current—voltage conversion device.

The rotation judgement circuit PRC is a signal processing circuit for processing the output signal from the rotation sensor and reliably judging if the motor is in a rotating condition (including rotation under inertia) or a stopped condition.

A first rectifying circuit REC 1 is for superimposing the input signal from the rotation sensor onto a power source voltage Vcc of the rotation judgement circuit PRC, and rectifying this to detect the envelope thereof. A high frequency signal generator 2, generates a high frequency signal which is superimposed via a resistor R4 onto the output signal from the first rectifying circuit REC 1 which has passed through a resistor R3. A wideband amplifier AMP is for amplifying the output signal from the first rectifying circuit REC 1 which has been superimposed with the high frequency signal, and is constructed so as to be saturated at the output level of the first rectifying circuit REC 1 for the motor rotating condition. A capacitor C1 is for transmitting the output signal from the first rectifying circuit REC 1, which has been superimposed with the high frequency signal, to the wideband amplifier AMP. A second rectifying circuit REC 2 is for rectifying the output signal from the amplifier AMP to detect the envelope thereof. A fail-safe two input window comparator 3 has a fail-safe construction so as not to generate an output of logic value "1" at the time of a fault. The output signal from the first rectifying circuit REC 1 which has been superimposed with the high frequency signal, is input to a first input terminal A of the window comparator 3 while the rectified signal which has been amplified by the wideband amplifier AMP and rectified by the second rectifying circuit REC 2 is input to a second input terminal B. Only when the levels of both signals are together within upper and lower limit threshold value ranges pre-set for each input terminal, is a motor stopped condition judged and an output "y" of logic value "1" generated. Such a fail-safe window comparator is previously known, for example from U.S. Pat. No. 4,661,880, U.S. Pat. No. 5,027,114, and Japanese Examined Patent Publication No. 1-23006, and has the same construction as in the previously mentioned disclosure of PCT/JP93/00411.

Figure 2:
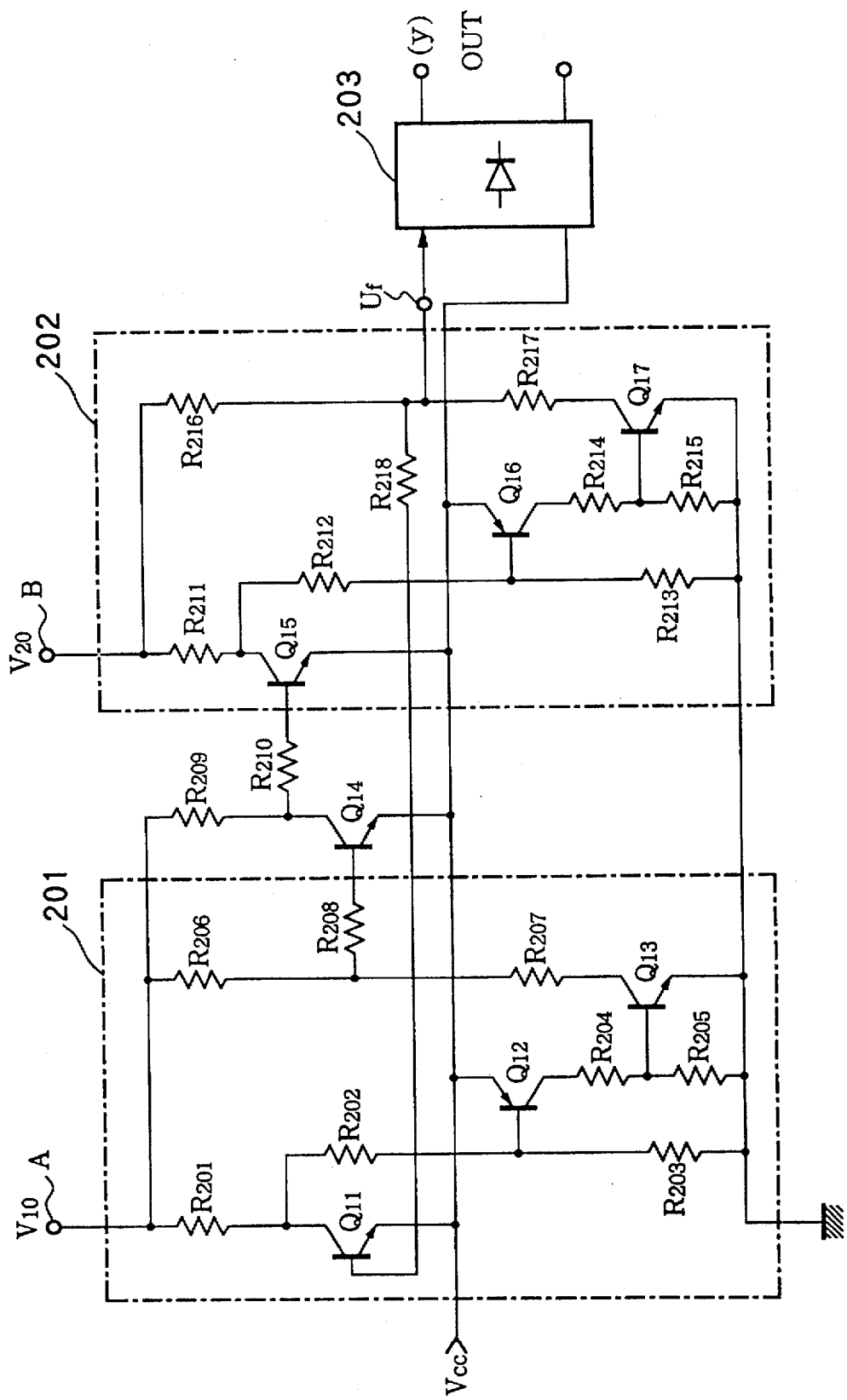
FIG. 2 is a circuit example of a two input window comparator.

FIG. 2 shows the circuit structure of the fail-safe window comparator. Since the circuit of FIG. 2 has a fail-safe logical product function, then to be precise this is a two input fail-safe window comparator/ AND gate.

In FIG. 2, symbols $R_{201}$ through $R_{218}$ indicate resistors, Q11 through Q17 indicate transistors, A and B indicate input terminals, Vcc indicates the power source potential for the window comparator, and numeral 203 indicates a rectifying circuit. The areas in FIG. 2 outlined by chain lines comprise direct-coupled direct current amplifying circuits 201, 202 which use the transistors Q11, Q12, Q13, and Q15, Q16, Q17. Both have identical direct current amplifying circuit constructions. The circuits differ from a general direct current amplifying circuit in that the transistor Q11 and the transistor Q15 are outside of the power source potential Vcc (the emitters of the NPN transistors Q11 and Q15 are connected to the power source potential Vcc). Consequently, an input signal having a voltage higher than the power source potential Vcc must be supplied to the base of the transistors Q11, and Q15. The collectors of the transistors Q11 and Q15 are connected to the input terminals A, B via respective resistors $R_{201}$ and $R_{211}$. It will be apparent that as long as input signals of a higher level than the power source potential Vcc (referred to as an input signal of potential outside the frame of the power source) are not supplied to the input terminals A, B, then the transistor Q11 and the transistor Q15 will not operate as amplifiers. Transistor Q14 constitutes a phase inversion circuit (inverter), and has an inverting amplification function on the output signal from the direct current amplifying circuit 201. Transistor Q14 also, as with transistors Q11 and Q15, operates with a base input potential and collector input potential (supplied from the input terminal A via resistor R209) higher than the power source potential Vcc. The base input signal to the transistor Q15 is supplied from the collector of the transistor Q14. Therefore if a signal of a higher input level than the power source potential Vcc is applied to the input terminal A, then a signal of a potential higher than the power source potential Vcc is supplied to the base of the transistor Q15.

The emitters of both transistors Q13 and Q17 are at earth potential, while the collectors are connected to the input terminals A and B via respective resistors R206, R207, and R216, R217. Consequently, if an input signal of a potential higher than the power source potential Vcc is applied to the input terminals A and B, then the collector potentials of the transistor Q13 and the transistor Q17 become earth potential when the transistors respectively come ON, and become the potential of the input terminals when the transistors respectively go OFF, that is, attain a potential higher than the power source potential Vcc. Since the switch signal resulting from switching the transistor Q13 and the transistor Q17 on and off, is respectively supplied to the base of the transistor Q14 via the resistor $R_{208}$, and to the base of the transistor Q11 via the resistor $R_{218}$, the transistor Q14 and the transistor Q11 can be respectively switched on and off using the output signal from the collector of the transistor Q13 and the output signal from the collector of the transistor Q17.

That is to say, the circuit of FIG. 2 constitutes a feedback oscillator, with the direct current amplifying circuit 201 direct-coupled to the direct current amplifying circuit 202 via the transistor Q14, and the output signal of the direct current amplifying circuit 202 direct-coupled to the direct current amplifying circuit 201 via the resistor R218.

Conditions for oscillation of the circuit of FIG. 2 are determined by the following equations, where V10 is the input potential of the input terminal A, and V20 is the input potential of the input terminal B;

For the input terminal A;

$$(r_{201}+r_{202}+r_{203})\ Vcc/r_{203} \leqq V_{10} \leqq (r_{206}+r_{207})VCC/r_{207} \quad (1)$$

For the input terminal B;

$$(r_{211}+r_{212}+r_{213})\ Vcc/r_{213} \leqq V_{20} \leqq (r_{216}+r_{217}) \quad (2)$$

In the above two equations, $r_{201}$ through $r_{217}$ indicate the resistance values of the respective resistors. In equation (1) $(r_{201}+r_{202}+r_{203})$ $Vcc/r_{203}$ represents the lower limit threshold value of the input terminal A, while $(r_{206}+r_{207})$ $Vcc/r_{207}$ represents the upper limit threshold value of the input terminal A. In a similar manner, $(r_{211}+r_{212}+r_{213})$ $Vcc/r_{213}$ in equation (2) represents the lower limit threshold value of the input terminal B, while $(r_{216}+r_{217})$ $Vcc/r_{217}$ represents the upper limit threshold value of the input terminal B. When the input terminal A has an input level $V_{10}$ within a range satisfying equation (1), and the input terminal B has an input level $V_{20}$ within a range satisfying equation (2), the circuit of FIG. 2 oscillates and an alternating current output signal is produced at a terminal Uf. This alternating current output signal is rectified in the rectifying circuit 203 to become a direct current output signal (when an alternating current output signal is not generated at the terminal Uf, then a direct current output signal of a level higher than the power source potential Vcc is not produced).

Since the circuit of FIG. 2 oscillates only when direct current input voltages which respectively satisfy equations (1) and (2) are supplied to the input terminals A and B, and can thus generate an alternating current output signal, it has the function of an AND gate. Moreover, since either of the input terminals A or B has a function of a window comparator, the circuit is called a two input window comparator/AND gate.

Moreover the circuit of FIG. 2 has the characteristic in that it cannot oscillate when a short circuit fault or a disconnection fault occurs in the transistors or resistors constituting the circuit. Furthermore, it has the characteristic in that it cannot oscillate even with a fault in the circuit elements, unless an input voltage determined by equation (1) and equation (2) is supplied to both input terminals A and B. Consequently, the circuit of FIG. 2 is referred to as a fail-safe window comparator/AND gate.

Figure 3:
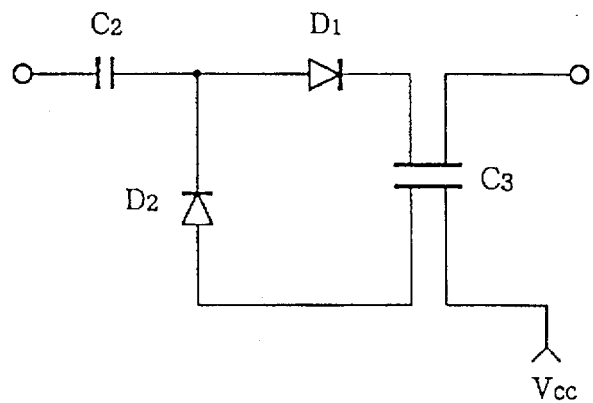
FIG. 3 is a circuit example of a rectifying circuit.

The rectifying circuits REC 1 and REC 2 are constructed as shown in FIG. 3 from two capacitors C2, C3 and two diodes D1, D2. The capacitor C2 is a coupling capacitor for transmitting the alternating current signal from the rotation sensor, while the capacitor C3 is a smoothing capacitor for smoothing only the high frequency component of the output signal from the rectifying diode D1. With the present embodiment, a four terminal capacitor is used, however a common two terminal capacitor may be used. Moreover, the diode D2 is a clamping diode for superimposing the signal transmitted by the capacitor C2 on the power source potential Vcc. The diode D1 is a rectifying diode for rectifying the signal which has been superimposed with the power source potential Vcc. The rectifying circuit 203 of the window comparator 3 also has the same construction.

Here with the coupling capacitor C2 in the first rectifying circuit REC 1, the electrostatic capacity is made large so that the capacitor C2 can transmit not only the high frequency signal from the alternating current signal generator 1, but also the low frequency signal from the tachometer generator accompanying rotation of the motor M. On the other hand, with the smoothing capacitor C3, the electrostatic capacity is such that the capacitor C3 can only smooth the high frequency signal from the alternating current signal generator 1, but cannot smooth the low frequency signal from the tachometer generator. Consequently, in the case wherein there is no output signal from the tachometer generator under the motor M stopped condition, the terminal voltage of the capacitor C3, that is to say the rectified output from the rectifying circuit REC 1, becomes a constant level output of the rectified high frequency signal from the alternating current signal generator 1, while in the case wherein the motor M rotates so that an output signal from the tachometer generator is generated, this changes with the amplitude?] of the low frequency signal.

The operation of the motor stopped verification apparatus of the first embodiment shown in FIG. 1 will now be described.

The detection output from the rotation sensor is input to the rectifying circuit REC 1 of the rotation judgement circuit PRC and rectified. A signal of this rectified signal superimposed with a high frequency signal from the high frequency signal generator 2 is then input to the first input terminal A of the window comparator 3, and is also input to the wideband amplifier AMP via the capacitor C1. The signal superimposed with the high frequency signal and input to the amplifier AMP is amplified by the amplifier AMP, envelope detected by the rectifying circuit REC 2, and then input to the second input terminal B of the window comparator 3.

Initially, when the rotor of the motor M is in a stopped condition, an output signal from the tachometer generator is not generated. At this time, a signal as shown by the full line in FIG. 4(a), for the high frequency signal supplied to the transformer T from the alternating current signal generator 1 which has been voltage divided by the resistors $R_1$, $R_2$, is input to the rectifying circuit REC 1 of the rotation judgement circuit PRC. In this case the rectified output level from the rectifying circuit REC 1 becomes the constant level signal S1 as shown in FIG. 4(C) under the smoothing effect of the capacitor C2. A signal of the constant level signal S1 superimposed with the high frequency signal is then input to the first input terminal A of the window comparator 3. The upper limit threshold value ThAH and the lower limit threshold value ThAL of the first input terminal A of the window comparator 3 are set as shown in FIG. 4(C) and since the input signal at this time is within the range of the upper and lower limit threshold values, the oscillation conditions for the first input terminal A of the window comparator 3 are satisfied. When the rectified output from the rectifying circuit REC 1 is a constant level, the rectified output from the rectifying circuit REC 2 is within the range of the upper and lower limit threshold values of the second input terminal B of the window comparator 3. Consequently, when the motor M is in the stopped condition, an output of logic value "1" is generated from the window comparator 3, thus indicating that the motor is in the stopped condition.

On the other hand, when the rotor of the motor M is in the rotating condition, an output signal is generated from the tachometer generator. This output signal is an alternating current signal of a low frequency corresponding to the rotation of the rotor. At this time, the high frequency signal from the alternating current signal generator 1 is modulated by the output signal from the tachometer generator as shown by FIG.(B) of and input to the rectifying circuit REC 1 of the rotation judgement circuit PRC as a modulated signal. Since with the rectified output from the rectifying circuit REC 1 at this time, only the high frequency signal is smoothed by the smoothing capacitor C3, then this becomes a periodically changing signal S1' as shown in FIG. 4(C) In this case, the signal input to the first input terminal A of the window comparator 3 is within the upper and lower limit threshold value range of the window comparator 3, and the oscillation conditions for the first input terminal A are thus satisfied. However, since this change is amplified by the wideband amplifier AMP to saturation, the high frequency input signal is masked and generated intermittently in the linear region of the wideband amplifier AMP during the saturation period. The intermittently appearing high frequency signal is rectified by the rectifying circuit REC 2 and input to the second input terminal B of the window comparator 3. The signal level however is lower than the lower limit threshold value ThAL of the second input terminal B. Therefore the oscillation conditions for the second input terminal B of the window comparator 3 are not satisfied so that the output from the window comparator 3 becomes a logic value "0", indicating that the motor M is in the rotating condition.

Figure 4A:
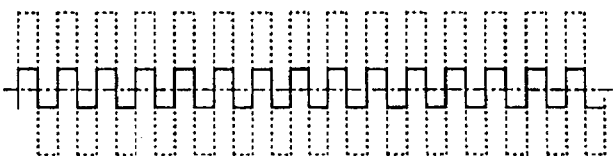
FIGS. 4(A)–4(C) represent a time chart for illustrating the operation of the first embodiment, with FIG. 4(a) showing a sensor output signal waveform when normal and abnormal, during motor rotation stopped, FIG. 4(B) showing a sensor output signal waveform during motor rotation, and FIG. 4(C) showing an output signal waveform of a first rectifying circuit of a rotation judgement circuit when normal.
Figure 4B:
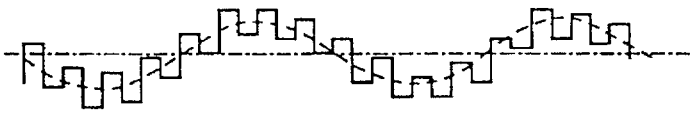
Figure 4C:
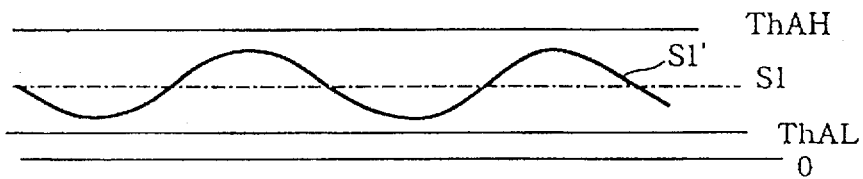

With the circuit of FIG. 1, if a disconnection fault occurs in the windings N1, N2 of the transformer T, or a disconnection fault occurs in the resistor R1, then when the motor M is in the stopped condition, the high frequency signal from the alternating current signal generator 1, shown in FIG. 4(A) is not input to the rectifying circuit REC 1 of the rotation judgement circuit PRC. Moreover, if a disconnection fault occurs in the resistor R2, or the terminals P1, P2 of the tachometer generator become disconnected, or a disconnection fault occurs in the windings of the tachometer generator, then the output signal from the tachometer generator is not transmitted to the rectifying circuit REC 1, but at this time, the output signal from the transformer T is transmitted to the capacitor C2 of the rectifying circuit REC 1 via the resistor R1. However, since this signal is not one which has been voltage divided by the resistors R1, R2, then it has a high level as shown by the dotted line FIG. 4(A). Hence the rectified output level from the rectifying circuit REC 1 becomes higher than the upper limit threshold value ThAH of the first input terminal A of the window comparator 3. The output from the window comparator 3 thus becomes a logic value "0", that is, becomes an output form the same as for the case where the motor is rotating. Consequently, the construction is fail safe.

With such a construction wherein the rotation sensor for sampling the motor M rotating/stopped detection output, uses the output signal from a tachometer generator, then even if the detection object (the motor) is changed, the troublesome adjustment such as with a bridge circuit is unnecessary. Moreover, since the output level from the rotation sensor can be made large, then an amplifier for amplifying the sensor output can be made redundant. Hence the problem of multiple faults occurring, with the rotation sensor and the amplifier faulting at the same time does not arise.

A second embodiment using a tachometer generator will now be described with reference to FIG. 5. Elements the same as in FIG. 1 are indicated by the same symbol and description is omitted.

Figure 5:
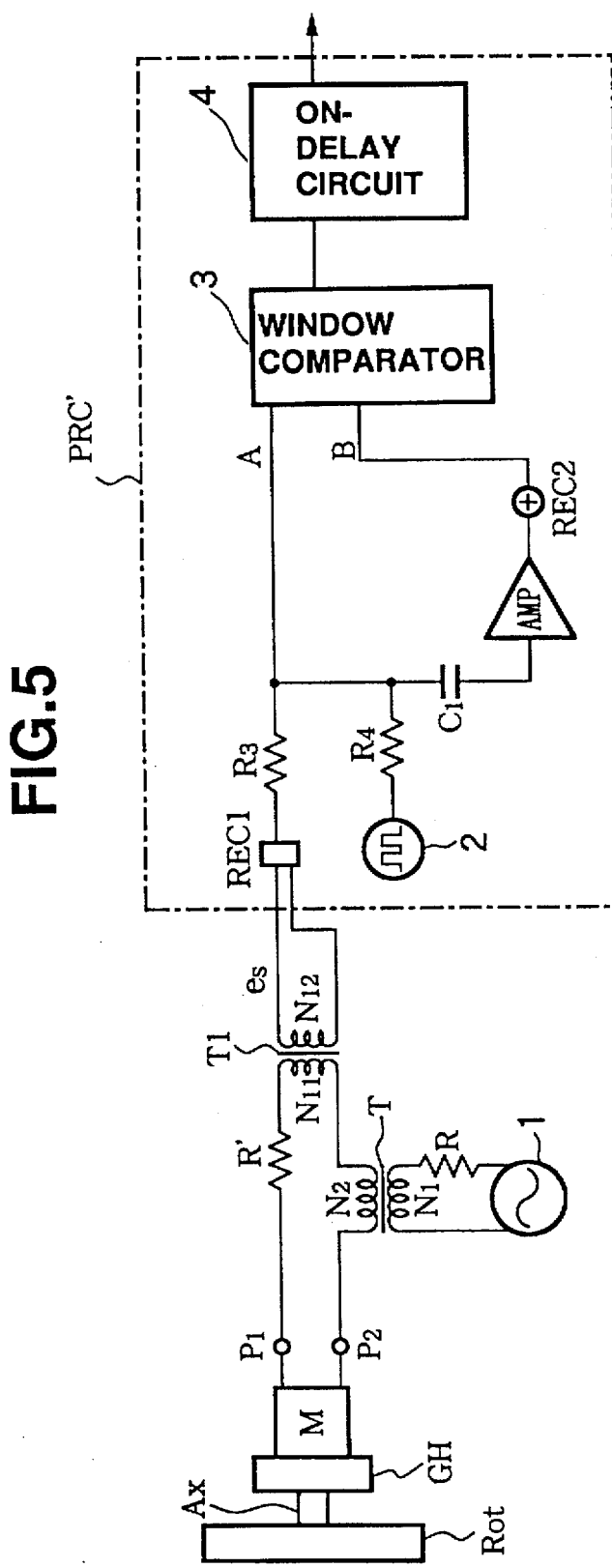
FIG. 5 is a circuit diagram of a second embodiment of the first aspect of the invention.

In FIG. 5, with the present embodiment, an alternating current signal generator 1 is connected to a primary winding N1 of a first transformer T via a resistor R. A series circuit of a current reducing resistor R', a secondary winding $N_2$ of the first transformer T, and a primary winding $N_{11}$ of a second transformer T1, is connected to output terminals P1, P2 of a tachometer generator. A secondary winding N12 of the transformer T1 is connected to a rectifying circuit REC 1 of a rotation judgement circuit PRC'. Here with this embodiment, the second transformer T1 has the function of a current voltage conversion device. Furthermore, at least one of the transformers T, T1 is constructed as a saturable magnetic core transformer (a transformer having a non linear characteristic). In the rectifying circuit REC 1 of this embodiment, it is not necessary for the electrostatic capacity of the coupling capacitor C2 and the smoothing capacitor C3 to be made significantly different as with the first embodiment, provided that the high frequency signal from the high frequency signal generator 1 can be rectified.

The operation of the second embodiment shown in FIG. 5 will now be explained.

When there is no output signal from the tachometer generator under the motor M rotor stopped condition, the output signal from the alternating current signal generator 1 is input to the coil of the tachometer generator via the transformer T, and to the primary winding N11 of the transformer T1 via the resistor R', and transmitted to the secondary winding N12 side.

Figure 6:
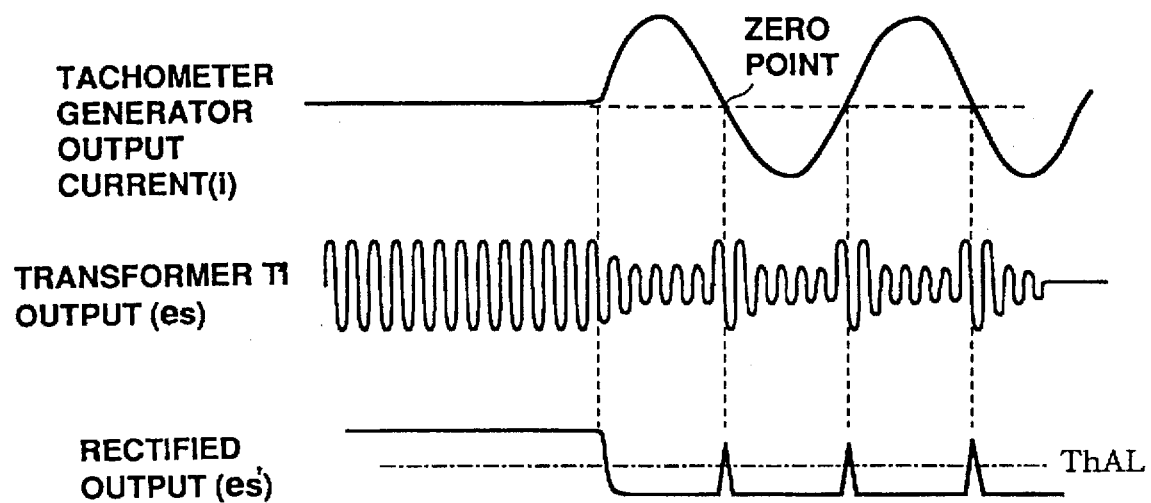
FIG. 6 is a time chart for explaining the operation of the second embodiment, showing the respective signal waveforms of a tachometer generator, a transformer and a rectifying circuit.

On the other hand, when an output signal is generated in the tachometer generator under the motor M rotor rotating condition, then by having at least one of the transformers T, T1 constructed as a saturable magnetic body core transformer, then the transformer side with the saturable magnetic body core becomes saturated by the output signal from the tachometer generator, so that the output signal level from the alternating current signal generator 1 transmitted to the secondary winding $N_{12}$ side of the transformer T1 drops. In this way, with the present embodiment, the alternating current signal from the alternating current signal generator 1 is modulated by the output signal from the tachometer generator. FIG. 6 shows for this embodiment, the relationship between the output current i from the tachometer generator, the secondary side output $e_s$ from the second transformer T1, and the rectified output $e_s'$ from the rectifying circuit REC 1.

More specifically, when there is no output current i from the tachometer generator under the motor M stopped condition, the output signal $e_s'$ from the transformer T1 is a high level so that the rectified output $e_s'$ from the rectifying circuit REC 1 exceeds the lower limit threshold value ThAL of the first input terminal A of the window comparator 3. At this time, the rectified output from the rectifying circuit REC 2 input to the second input terminal B of the window comparator 3, also becomes a value exceeding the lower limit threshold value of the second input terminal B. Hence an output of logic value "1" indicating the motor M stopped condition is generated from the window comparator 3.

On the other hand, when an output current i is generated in the tachometer generator under the motor M rotor rotating condition, then since the transformer with the saturable magnetic body core becomes saturated, the output signal $e_s$ from the transformer T1 becomes a low level, so that the rectified output $e_s'$ from the rectifying circuit REC 1 becomes lower than the lower limit threshold value of the first input terminal A of the window comparator 3, and the rectified output from the rectifying circuit REC 2 also becomes lower than the lower limit threshold value of the second input terminal B of the window comparator 3. However in this case, since the output signal i from the tachometer generator is an alternating current, then there is periodically a point (zero point) where the current i becomes zero. Hence the output signal $e_s$ from the transformer T1, and the rectified output $e_s'$ from the rectifying circuit REC 1 periodically become a high level as shown in FIG. 6, so that the input level to the window comparator 3 periodically exceeds the lower limit threshold value. Hence, although the motor M is rotating, an output of logic value "1" indicating that the motor is stopped, is intermittently generated from the window comparator 3.

Therefore, with the rotation judgement circuit PRC' of the second embodiment, as shown in FIG. 5, a fail-safe on-delay circuit 4 such as shown in the previously filed patent application PCT/JP93/00411, for generating an output only at a time when the output signal from the window comparator 3 continues for a predetermined time, is provided after the window comparator 3, and the output from the on-delay circuit 4 is made the judgement output of the rotation judgement circuit PRC'. In this way, the intermittently generated output signal of logic value "1" from the window comparator 3 can be masked. Hence during the motor M rotating condition, the judgement output of logic value "0" from the rotation judgement circuit PRC' can be continuously output, enabling indication that the motor M is in the rotating condition. The fail-safe on-delay circuit has the characteristic that an initially set delay time is not shortened with a circuit fault. Moreover, with the second embodiment, the window comparator 3 need only have a lower limit threshold value (the upper limit threshold value of the window comparator 3 is set to a sufficiently high level and the window comparator is used as a level detector).

Figure 7:
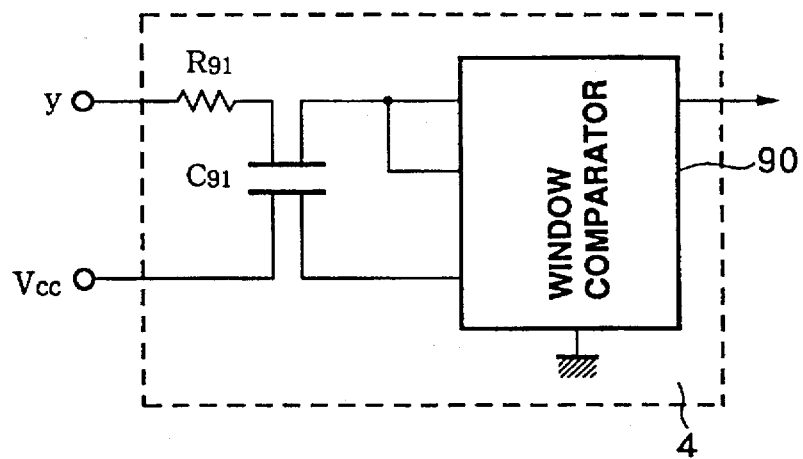
FIG. 7 is a circuit example of an on-delay circuit.

FIG. 7 shows an example of a simple on-delay circuit construction having a fail safe function.

In FIG. 7, if the input resistance of a window comparator 90 is made sufficiently high compared to that of a resistor R91, then the oscillation delay of the window comparator, that is to say the delay time, after inputting the input signal y=1(an input signal of a higher level than the power source potential $V_{cc}$) from the window comparator 3, is determined by the resistor R91, a four terminal capacitor C91, and the threshold value of the window comparator 90. With the circuit of FIG. 7, the output signal can be made zero, even if a disconnection fault occurs in the resistor R91, or a disconnection or short circuit fault occurs in the electrodes of the capacitor C91.

In the case of the second embodiment also, as with the first embodiment, even if the motor being rotation detected is changed, the troublesome adjustment of the rotation sensor side is unnecessary. Moreover, in addition, with the second embodiment there is the characteristic that the output line from the tachometer generator, and the electronic circuits of the rotation judgement circuit PRC' etc. can be isolated from each other by the second transformer T1.

With the second embodiment, the construction with the secondary winding N2 of the second transformer T and the output terminals P1, P2 of the tachometer generator series connected, and the output signal from the alternating current signal generator 1 supplied to the output terminals P1, P2 of the tachometer generator as a current signal is an important feature. Due to this construction, if the output terminals P1, P2 of the tachometer generator become disconnected, or a disconnection fault occurs in the windings of the tachometer generator, the output signal from the alternating current signal generator 1 is not transmitted to the rotation judgement circuit PRC' side. Hence the output signal $e_s'$ from the rectifying circuit REC 1 becomes zero, and an output of logic value "0", the same as for when the motor M is rotating, is generated from the rotation judgement circuit PRC', thus being fail-safe. That is to say, with the first aspect of the invention, the construction is such that the alternating current signal from the alternating current signal generator 1 becomes an inspection signal for inspecting fault detection of the tachometer generator.

Figure 8:
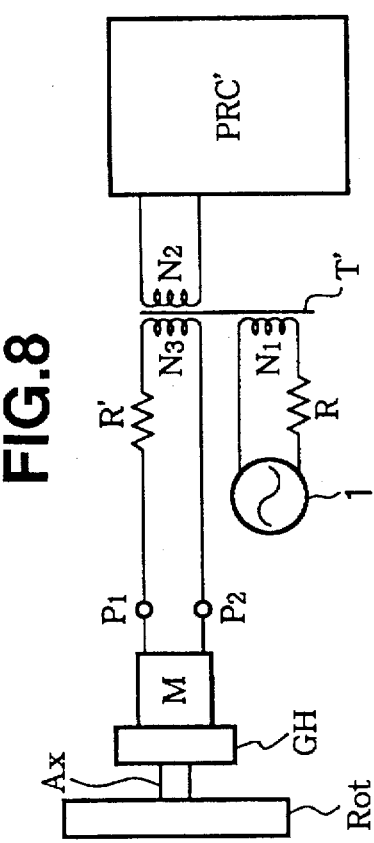
FIG. 8 is a non-fail safe circuit example.

Incidentally, the circuit structure of FIG. 8 can also be considered. In this case, a third winding N3 is provided in a first transformer T', and this third winding N3 is connected to the output terminals P1, P2 of the tachometer generator via a current reducing resistor R'. The transformer T' is the transformer with a saturable magnetic body core.

In this case, when there is no output current i from the tachometer generator, the transformer T' is not saturated, so that the output signal from the alternating current signal generator 1 is transmitted in a high level condition from the primary winding N1 of the transformer T' to the secondary winding $N_2$, via the current reducing resistor R, and an output signal of logic value "1" indicating that the motor M is stopped is generated from the rotation judgement circuit PRC'. On the other hand, when an output current i is generated from the tachometer generator, since the transformer T' becomes saturated by this output current i, the output signal from the alternating current signal generator 1 transmitted from the primary winding N1 of the transformer T' to the secondary winding N2, becomes a low level, and an output signal of logic value "0" indicating that the motor M is rotating is generated from the rotation judgement circuit PRC'.

With such a construction, there is the advantage compared to the circuit of FIG. 5, in that only one transformer is required. However if the output terminals P1, P2 of the tachometer generator become disconnected, or a disconnection fault occurs in the current reducing resistor R' or in the tachometer generator, then the transformer T' will not become saturated, so that the output signal from the alternating current signal generator 1 is transmitted in a high level condition from the primary winding N1 of the transformer T' to the secondary winding N2, and an output signal of logic value "1" indicating that the motor M is stopped is generated from the rotation judgement circuit PRC', in spite of the motor M rotating. Hence this has the defect in that fail safety cannot be ensured. This is due to the output current from the alternating current signal generator 1 not being supplied directly to the winding of the tachometer generator, and hence not being used as an inspection signal for fault detection of the tachometer generator (a voltage signal is supplied to the tachometer generator).

Figure 9:
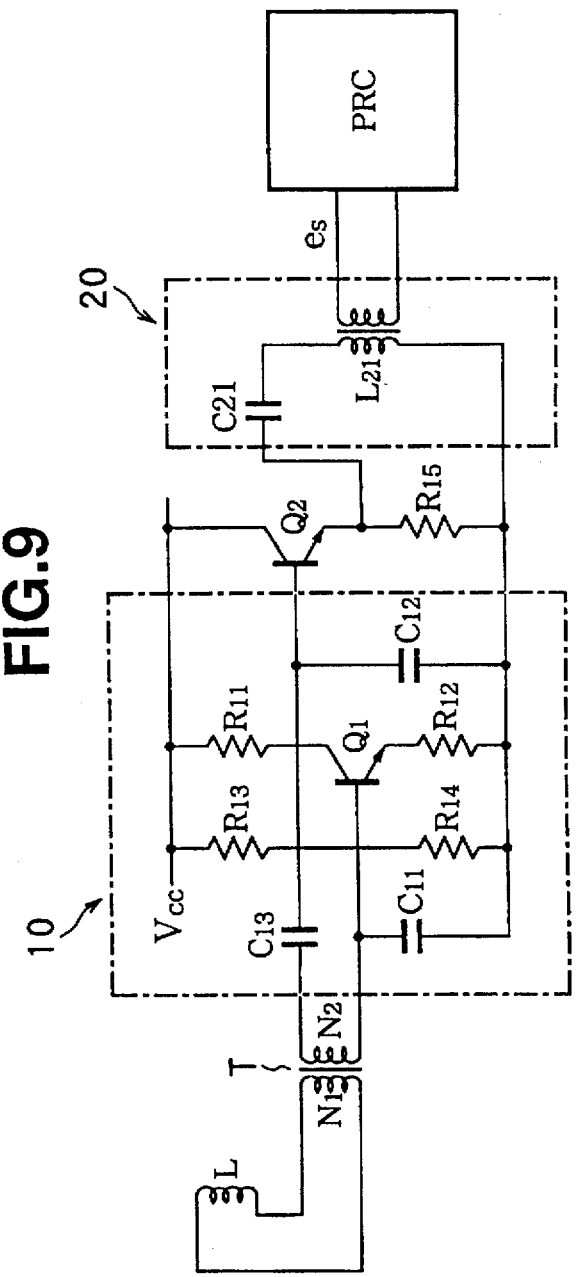
FIG. 9 is a circuit diagram illustrating an embodiment of a motor stopped verification apparatus according to a second aspect of the invention.

FIG. 9 shows an embodiment of the second aspect of the invention. Elements the same as in FIG. 1 are indicated by the same symbol and description is omitted.

Here the rotation sensor for generating a motor M rotating/stopped detection output, is constructed such that the inductance change of a pickup coil serving as a transducer coil for converting the motor rotation into a voltage signal, is converted into a frequency change of an oscillator and then sampled.

In FIG. 9, a pickup coil L for detecting recesses/protrusions on the periphery of a metal rotation body (not shown) which is driven by a motor M, is located close to the periphery of the metal rotation body. When the metal rotation body is rotated by the motor M, a distance between the pickup coil L and the metal rotation body changes periodically due to the passing of the recesses/protrusions on the rotation body periphery. The rotation of the motor M can thus be detected from an inductance change of the pickup coil L. Since when the motor power source is switched off, the exciting winding of the motor is merely a coil, then the motor exciting winding can be used instead of the pickup coil.

An oscillator 10 with a construction including the pickup coil L is in the form of a Colpitts type oscillator. With the present embodiment, a known transistor amplifier is constructed from a transistor Q1 and resistors $R_{11} \sim R_{14}$, while capacitors $C_{11}$, $C_{12}$ (which determine the oscillation frequency) and the pickup coil L give a resonance circuit. The resistors $R_{11}$, $R_{12}$ are emitter resistors while the resistors $R_{13}$, $R_{14}$ are bias resistors, The capacitor $C_{13}$ is a direct current blocking capacitor for ensuring that a direct current does not flow from the collector of the transistor $Q_1$ to the base via the secondary winding $N_2$ of the transformer T.

The oscillation frequency f of the oscillator 10 is determined approximately from the following equation (3), with C11, C12 as the electrostatic capacity of the capacitors C11, C12 and L as the inductance of the pickup coil L:

$$f = 1/2\pi (LC_0)^{1/2} \quad (3)$$

where $$C_0 = C_{11} \cdot C_{12}/(C_{11} + C_{12}).$$

Moreover if the number of windings of the primary winding N1 and the secondary winding N2 of the transformer T is made equal, then the inductance of the pickup coil L, as seen from the secondary side of the transformer T, is approximately L.

A transistor $Q_2$ and a resistor $R_{15}$ constitute an emitter follower amplifier which carries out impedance matching of an LC filter in a subsequent frequency—voltage converter 20. A capacitor C21 and an inductance L21 constitute a high pass LC filter corresponding to the LC filter. The frequency—voltage converter 20 outputs a voltage signal corresponding to the output frequency from the oscillator 10, to the rotation judgement circuit PRC.

The rotation sensor of FIG. 9 is thus constructed so as to sample the inductance change of the pickup coil L as a change in frequency of the oscillator 10, and convert this frequency change into a voltage change.

The operation will now be described.

Figure 10:
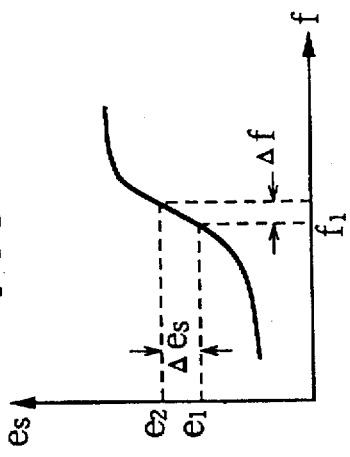
FIG. 10 is a frequency—voltage characteristic diagram for explaining the operation of the embodiment.

When the motor M is rotating, the recesses/protrusions on the periphery of the metal rotation body periodically oppose the pickup coil L with rotation of the metal rotation body. For example, if f1 is the oscillation frequency of the oscillator 10 corresponding to the inductance of the coil L when the recess opposes the pickup coil L, and e1 is the output signal from the frequency—voltage converter 20 at this time, then when the protrusion opposes the pickup coil L with rotation of the motor M, the distance between the coil and metal rotation body becomes small so that the inductance of the pickup coil L reduces. Therefore, as shown in FIG. 10, the oscillation frequency of the oscillator 10 increases by $\Delta f$, and the output signal $e_s$ from the frequency—voltage converter 20 also increases by $\Delta e_s$ from $e_2$. Consequently, when the motor M is rotating, the input signal to the rotation judgement circuit PRC periodically changes between $e_1$ and $e_2$ with an amplitude of $\Delta e_s$. In this case, since the input signal level on the second input terminal B side of the window comparator 3 in the rotation judgement circuit PRC, becomes lower than the lower limit threshold value, the output signal from the rotation judgement circuit PRC becomes a logic value "0".

On the other hand, when the motor M is stopped, the input signal to the rotation judgement circuit PRC becomes a constant level signal between $e_1$ and $e_2$ depending on the stop location of the metal rotation body. By setting this signal level so as to fall within the threshold value range of the window comparator 3, then when the motor M is stopped, the output signal from the window comparator 3 becomes a logic value "1".

With the construction of this embodiment, in the case where it is necessary to change the pickup coil L with the metal rotation body being changed, then the electrostatic capacity of the resonance capacitors C11, C12 of the oscillator 10 can be simply adjusted. Hence compared to the conventional sensor circuit which uses a bridge circuit, adjustment is simplified. Moreover, if the power source potential Vcc is increased, so that the output level from the oscillator 10 is similarly increased, then an amplifier for amplifying the output from the rotation sensor is not required.

A motor rotation stopped verification apparatus of a third aspect of the invention will now be described.

Figure 11:
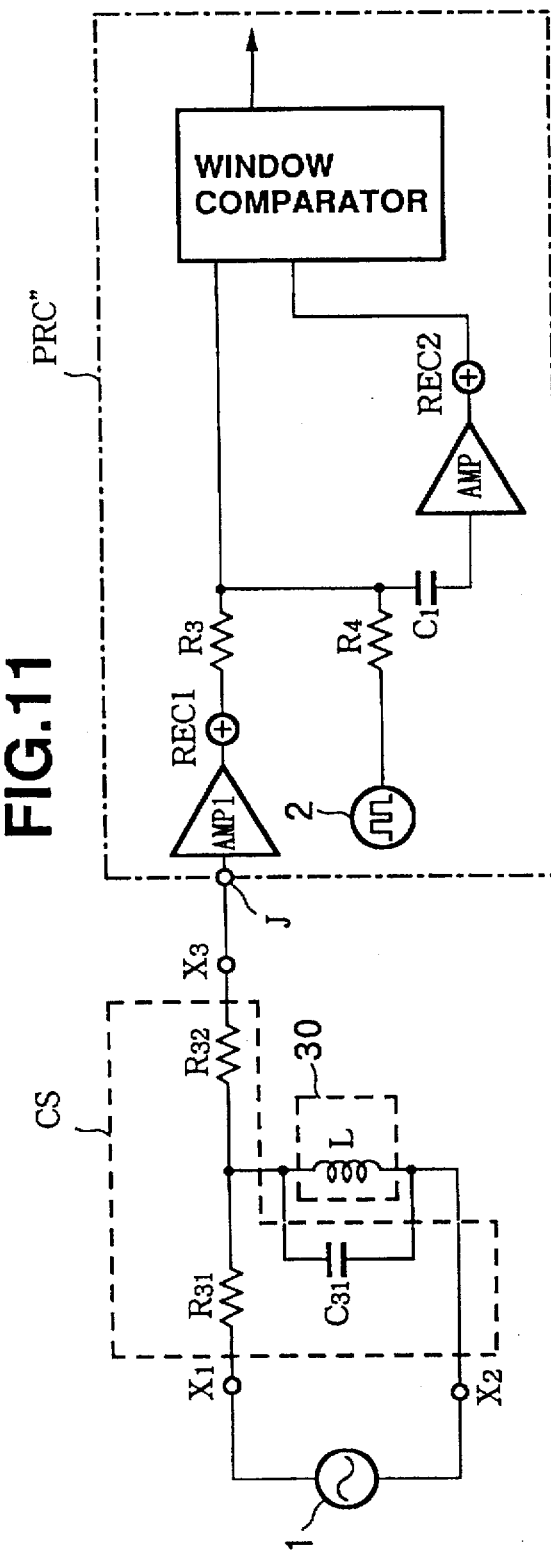
FIG. 11 is a circuit diagram illustrating a first embodiment of a motor stopped verification apparatus according to a third aspect of the invention.

FIG. 11 shows the circuit diagram of a first embodiment of the third aspect of the invention. Elements the same as in FIG. 1 are indicated by the same symbol and description is omitted.

In FIG. 11, the rotation sensor of this embodiment comprises; an alternating current signal generator 1, a pickup coil L serving as a transducer coil for detecting the rotation of a metal rotation body $R_{ot}$ which rotates as one with a motor M, a capacitor $C_{31}$ connected in parallel with the pickup coil L so as to constitute a resonance circuit, and resistors $R_{31}$, $R_{32}$. A series resonance circuit with the pickup coil L and the capacitor $C_{31}$ connected in series is also possible. Moreover, in the case of a rotation judgement circuit PRC" of the present embodiment which takes the detection output from the rotation sensor and judges the rotation or rotation of the metal rotation body Rot, a fail-safe first amplifier AMP 1 for amplifying the input signal from the rotation sensor is provided prior to a rectifying circuit REC 1. Other details of the construction are the same as for the arrangement shown in FIG. 1 and hence description is omitted. The amplifier AMP in this embodiment corresponds to the second amplifier.

Figure 12:
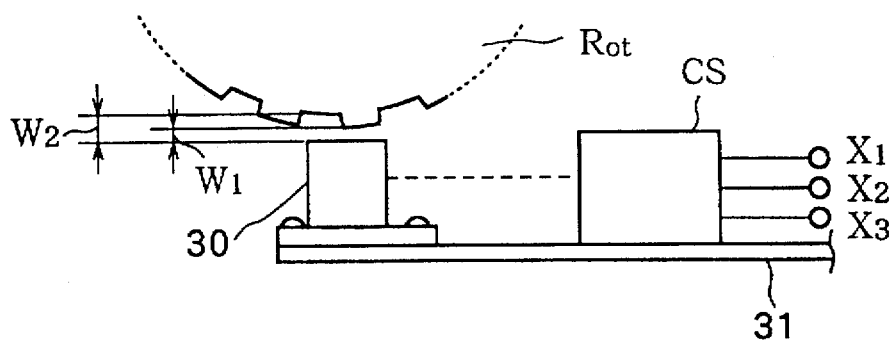
FIG. 12 is a diagram showing an attachment arrangement of a coil of the first embodiment of the third aspect of the invention.

An attachment arrangement of the rotation sensor is shown in FIG. 12.

In FIG. 12, the pickup coil L is housed in a coil housing case 30, secured to an upper face of a metal mount 31 located close to a metal rotation body Rot having recesses/protrusions around the periphery thereof. The resistors R31, R32 and the capacitor C31 which constitute the other signal transmission elements of the rotation sensor apart from the pickup coil L, are housed in an accessories housing case CS, separate from the coil housing case 30, and secured to the upper face of the metal mount 31. The pickup coil L in the coil housing case 30 side and the components in the accessories housing case CS side are connected together via a lead wire (shown as a dotted line in FIG. 12). The accessories housing case CS is connected to the alternating current signal generator 1 side by means of terminals X1, X2 and to the rotation judgement circuit PRC" side by means of a terminal X3. The alternating current signal generator 1 is provided on the rotation judgement circuit PRC" side mounted at another location away from the rotation sensor. The coil housing case 30, the accessories housing case CS, and the metal mount 31 constitute a transducer head.

The operation of the circuit of FIG. 11 will now be described.

The current supplied from the alternating current signal generator 1 is supplied via the resistor R31, to the resonance circuit of the pickup coil L and the capacitor C31, and the terminal voltage of the resonance circuit is input via the resistor R32, to the rotation judgement circuit PRC". Here with the respective distances between the protrusions and the recesses on the periphery of the metal rotation body Rot and the pickup coil L, as W1, W2 (W1 <W2), the distance between the metal rotation body Rot and the pickup coil L periodically changes with rotation of the metal rotation body Rot, and the terminal voltage of the resonance circuit changes in accordance with the inductance change of the pickup coil L. Hence the input signal level to the rotation judgement circuit PRC" changes.

Figure 13:
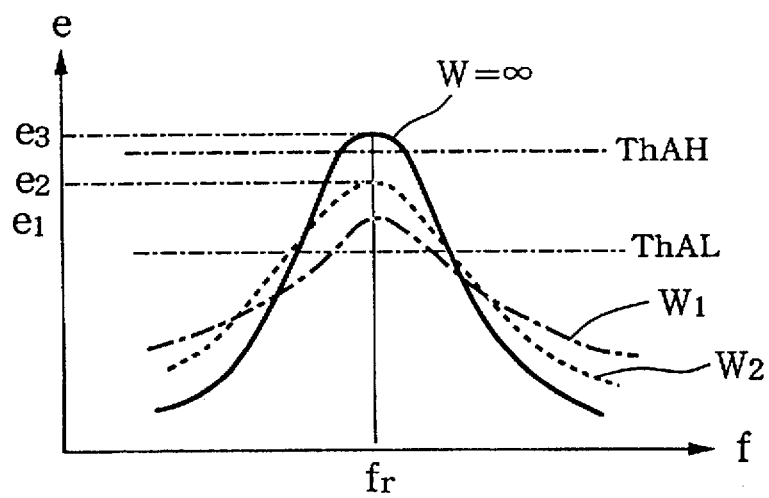
FIG. 13 is a diagram showing a relation between separation distance of a metal rotation body and the coil, and the output from the first rectifying circuit.

FIG. 13 shows the relationship between the change in distance between the metal rotation body Rot and the pickup coil L, and the rectified output from the rectifying circuit REC 1 of the rotation judgement circuit PRC". Here $f_r$ is the oscillation frequency of the alternating current signal generator 1. The rectified output changes between e1 and e2 (e1 <e2) when the protrusion of the metal rotation body Rot is close, and when the recess is close. The rectified output e3 is for the case wherein there is no metal rotation body (W=∞).

Accordingly, since when the metal rotation body Rot is rotated by the motor M, the output level of the rectifying circuit REC 1 of the rotation judgement circuit PRC" periodically changes, then the input level on the second input terminal B side of the window comparator 3 does not satisfy the oscillation condition. Hence the output from the window comparator 3 becomes a logic value "0". On the other hand, when the metal rotation body Rot is stopped, the rectified output is constant at a level between e1 and e2, and since the upper limit and lower limit threshold values of the first and second input terminals of the window comparator 3 are set as shown in FIG. 13, the output from the window comparator 3 becomes a logic value "1", indicating that the metal rotation body Rot is stopped.

Furthermore, by setting the upper limit threshold value ThAH of the input terminal A of the window comparator 3 between the rectified outputs e2 and e3, if the pickup coil L becomes detached from the metal mount 31 to which it is attached, then an output of logic value "0" indicating danger is generated from the rotation judgement circuit PRC".

Furthermore, if a disconnection fault occurs in the pickup coil L, or the capacitor C31, then the output level of the terminal X3, that is to say the input level of the amplifier AMP 1 of the rotation judgement circuit PRC" rises. However at this time, even if a fault giving a drop in the amplified output occurs simultaneously in the amplifier AMP 1, since with the rotation sensor of this embodiment, the rise of the output is small compared to with the conventional bridge circuit, the input level to the window comparator 3 can be kept below the threshold value of the window comparator 3, so that fail safe characteristic can be maintained.

This will be explained more fully below.

Figure 14:
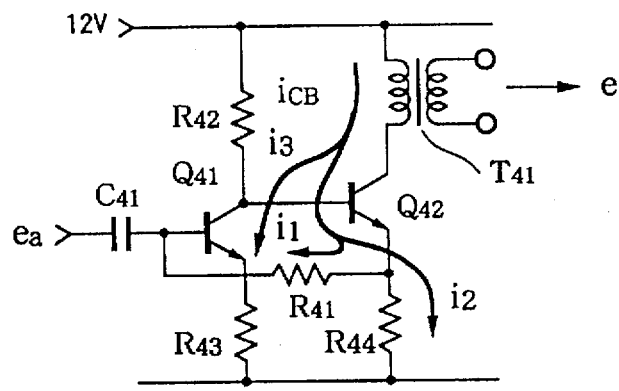
FIG. 14 is a circuit example of a first amplifying device of the rotation judgement circuit.
Figure 15:
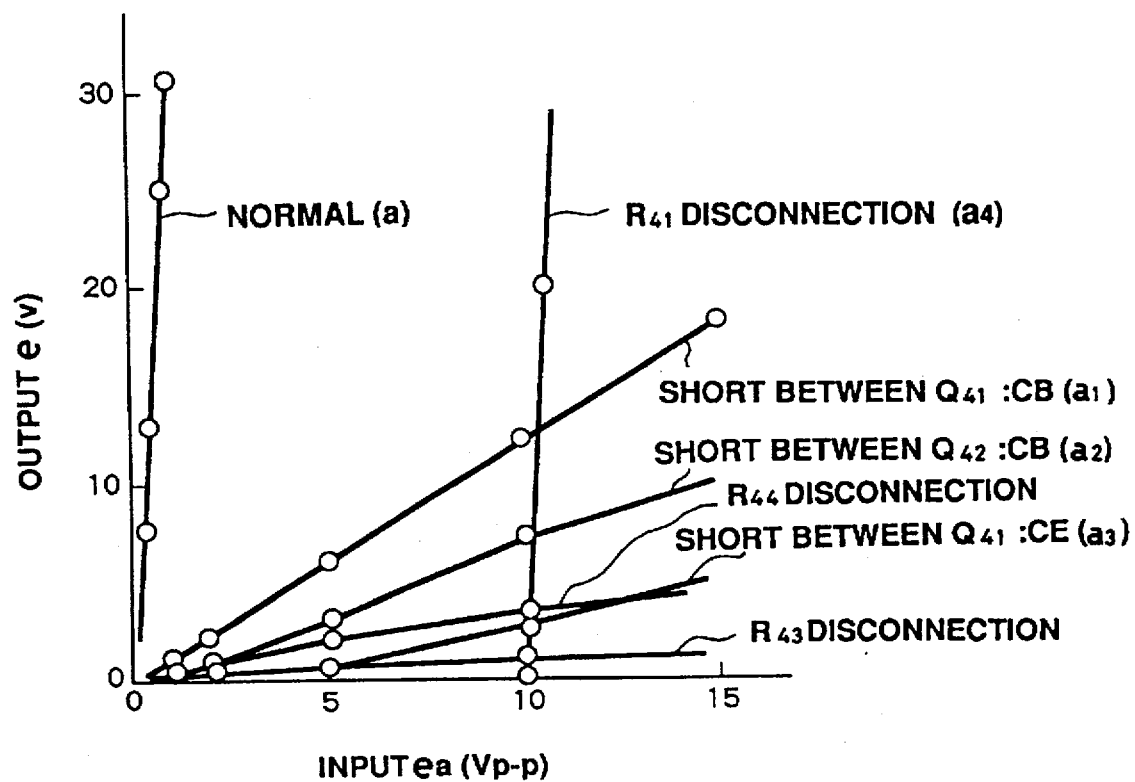
FIG. 15 is an input-output characteristic diagram at the time of a single fault in the amplifying device of FIG. 14.

FIG. 14 shows a construction example of the fail safe amplifier AMP 1, while FIG. 15 shows an example of the input/output characteristics at the time of a single fault in the amplifier AMP 1.

In FIG. 15, the horizontal axis represents the input signal $e_a$(peak to peak value) to the amplifier AMP 1, While the vertical axis represents the output signal e (the rectified output from the rectifying circuit REC 1 when the output signal from the transformer $T_{41}$ is made the input signal to the rectifying circuit REC 1 ). The curve (a) shows the input/output characteristics for the case where the amplifier AMP 1 is in a normal operating condition, while the other curves (a1) ~(a4) show the input/output characteristics for the case where the amplifier AMP 1 is faulty. In FIG. 15, short between Q42:CB for example (the curve (a2) case), has the meaning as shown in FIG. 14 of a short circuit between the collector and base of the transistor Q42, meaning the condition wherein a current iCB =i1+i2+i3 flows continually in the transistor Q42. Moreover, short between Q41:CE (the curve (a3) case), has the meaning of a short circuit between the collector and base of the transistor Q41. In FIG. 15, a fault wherein due to a fault in the amplifier AMP 1 of FIG. 14, the input and output are isolated (for example a disconnection fault in the base of the transistor Q41 or the transistor Q42, or a disconnection fault in the transformer T41 or the collector of the transistor Q42) is not shown. The reason for this is that with this type of fault, it is clear that the output signal e is not output (e =0).

From FIG. 15 it can been seen that the amplification level of the amplifier AMP 1 of FIG. 14 drops to less than ¹⁄₁₀ with a fault. Consequently, even in the case where a disconnection fault occurs in the pickup coil L, or the capacitor C31, and moreover a fault occurs in the fail-safe amplifier AMP 1, it is possible to make the output signal e from the rectifying circuit REC 1 a level lower than the lower limit threshold value of the first input terminal A of the window comparator 3. Hence sufficient fail safe characteristics can be maintained even with respect to multiple faults.

Figure 16:
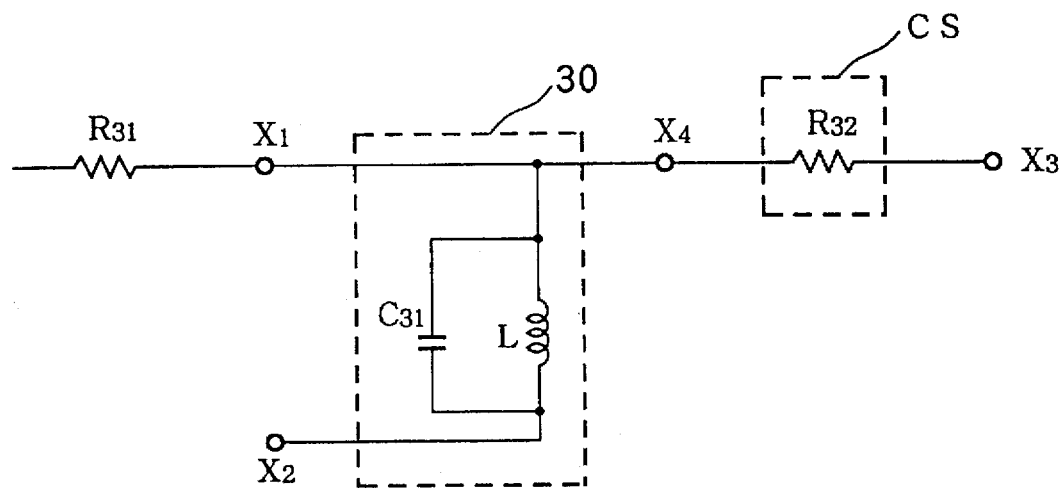
FIG. 16 is a modified mode of the first embodiment of the third aspect.

Moreover, with the present embodiment, the pickup coil L and the other accessories such as the resistors R31, R32 and the capacitor C31 are kept apart in separate housing cases. The reason for this is that by securing the accessories housing case CS to the metal mount 31 secured integrally to the motor drive apparatus side and located close to the metal rotation body Rot, then the rotation sensor will not operate normally unless the pickup coil L is positively mounted at a predetermined location close to the metal rotation body Rot. The components housed in the accessories housing case CS can be at least one of; the resistors R31, R32 and the capacitor C31. Moreover, the construction may be as shown in FIG. 16, with the resistor R31 located on the alternating current signal generator 1 side positioned at a location away from the metal rotation body Rot with the terminal thereof made X1, the capacitor C31 housed together with the pickup coil L in the coil housing case 30, and only the resistor R32 housed in the accessories housing case CS, and a terminal X4 provided for connecting the coil housing case 30 to the accessories housing case CS.

Since with this arrangement, the construction is such that, even if the coil housing case 30 is connected directly to the rotation judgement circuit PRC", the output from the rotation judgement circuit PRC" (the output from window comparator 3) cannot be made a logic value "1". For example, in the case wherein the coil housing case 30 of FIG. 16 is connected directly to the rotation judgement circuit PRC" via the terminal X4 and not via the accessories housing case CS, then since there is no signal attenuation effect from the resistor R32 inside the accessories housing case CS, the output signal e from the rectifying circuit REC 1 becomes higher than normal and thus exceeds the upper limit threshold value ThAH of the first input terminal A of the window comparator 3.

That is to say, such poor quality interference where at least the pickup coil L is not mounted on the metal mount 31 located close to the metal rotation body Rot, and another pickup coil is connected to the rotation judgement circuit PRC", and placed close to a part corresponding to the metal rotation body Rot, then the rotation stopped signal being generated continuously, can be prevented. This interference prevention becomes more effective the more complicated the circuit construction inside the accessories housing case CS, with not only the resistor R32 placed inside as in FIG. 16, but also with the resistor R31 and the capacitor C31 placed inside. In particular, when the capacitor C31 is put into the accessories housing case CS, then even if a coil other than a pickup coil L which is already installed is connected, it becomes difficult to obtain a fixed resonance circuit. That is to say, if the accessories housing case CS is one which is formed integral with the metal mount 31, the system can be such that the rotation judgement circuit PRC" will not operate unless a prescribed pickup coil L is mounted on the metal mount 31.

Figure 17:
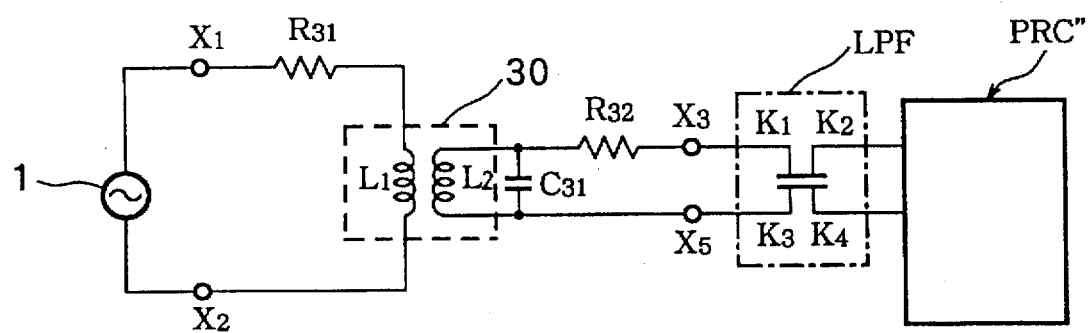
FIG. 17 is a circuit diagram of a second embodiment of the third aspect.

FIG. 17 shows a second embodiment of the third aspect of the invention.

Figure 18A:
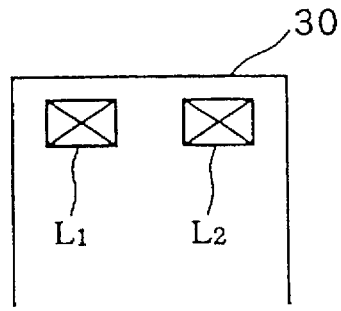
FIGS. 18(A) AND (18B) show a housing structure example for the coil of the second embodiment of the third aspect, with FIG. 18(A) being for the case of a loose coupled structure, and (B) being for the case of a closely coupled structure.
Figure 18B:
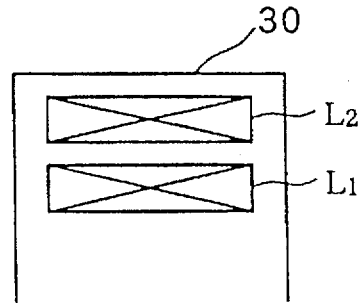

In FIG. 17, the pickup coil L comprises two coils L1, L2 coupled to each other. In this case, methods considered for housing these in the coil housing case 30, involve a method as shown in FIG. 18(A) wherein the coils L1 and L2 are slightly separated and loose coupled, or a method as shown in FIG. 18(B) wherein the coils L1 and L2 are closely coupled by stacking. In either case, the coupling between the coils changes with the passing of the recesses/protrusions of the metal rotation body Rot close to the upper face of the coil housing case 30.

With the construction of FIG. 17, if a disconnection fault occurs in the coils L1, L2 or the capacitor C31, the output signal from terminal X3 infallibly drops, so that as with the case of the first embodiment shown in FIG. 11, the output signal from the rectifying circuit REC 1 does not rise. Consequently, if poor quality interference where a different pickup coil is connected to the rotation judgement circuit PRC" is not considered, then since the output signal from the rectifying circuit REC 1 always drops at the time of a fault, only the lower limit threshold value of the first input terminal A of the window comparator 3 need be set. Moreover, the fail-safe characteristics can also be maintained when the amplifier AMP 1 faults simultaneously.

Figure 19:
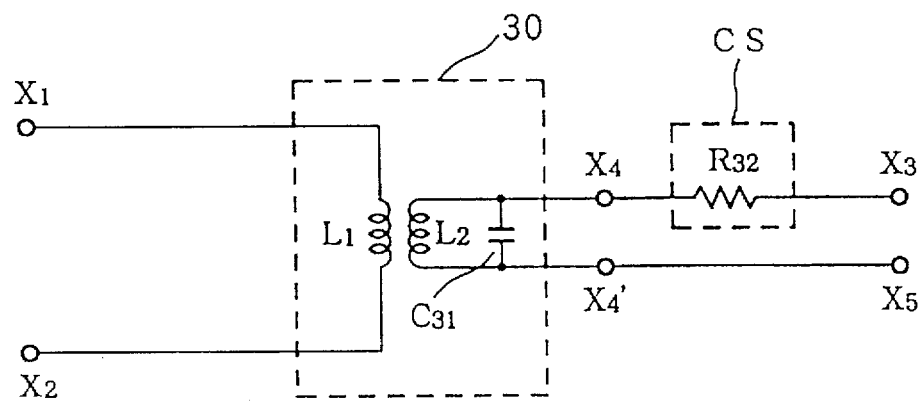
FIG. 19 is a modified mode of the second embodiment of the third aspect.

However, in the case of a construction as shown in FIG. 19 where, as with FIG. 16, the resistor R31 is housed on the alternating current signal generator 1 side with the output terminal thereof made X1, the capacitor C31 is housed in the coil housing case 30 together with the pickup coils L1, L2, and the resistor R32 only is housed in the accessories housing case CS, then in order to distinguish between a normal connection condition with the coil housing case 30 side connected to the rotation judgement circuit PRC" via the resistor R32, and an abnormal connection condition with the coil housing case 30 side connected directly to the rotation judgement circuit PRC" side and not via the resistor R32 (the case where there is no attenuation in the output due to resistor R32), an upper limit threshold value ThAH for the first input terminal A of the window comparator 3 becomes necessary.

When in FIG. 17 the coupling method of FIG. 18(A) is adopted and the receiving level of the coil L2 is low, then it is necessary to insert a low pass filter LPF as shown in FIG. 17 between the resistor R32 and the rotation judgement circuit PRC". More specifically, if a disconnection fault occurs in the capacitor C31 of the resonance circuit, the output level of the coil L2 drops. However the frequency selection characteristics of the coil L2 are lost so that noise of a frequency higher than the output frequency of the alternating current signal generator 1 can be easily received. The low pass filter LPF thus becomes necessary to remove this high frequency noise level. The use of a four terminal capacitor is so that in a worst case scenario where disconnection faults occur in the four terminals K1–K4 of the four terminal capacitor, an output signal is not generated from the rectifying circuit REC 1.

Figure 20:
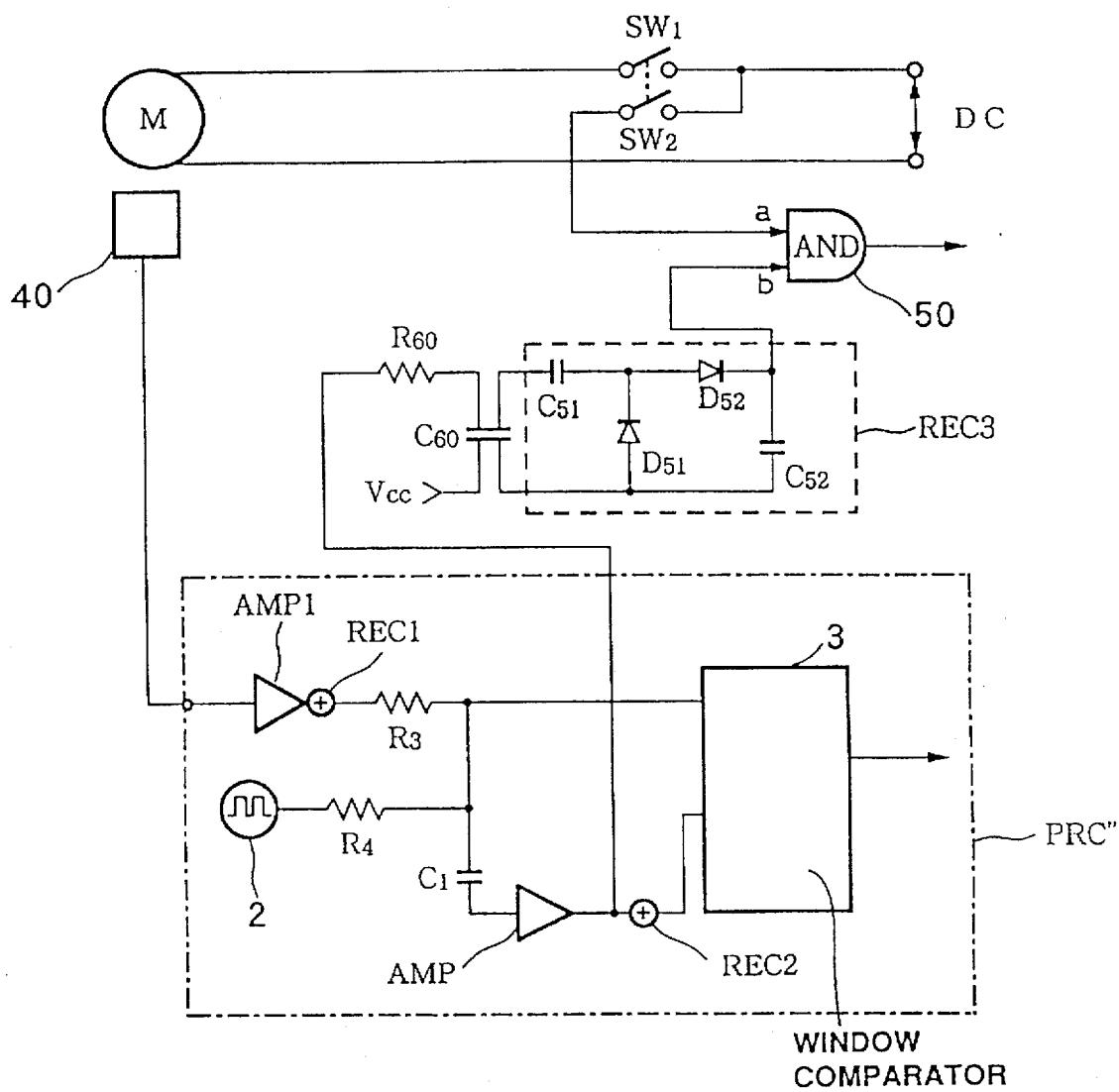
FIG. 20 is a circuit diagram of a third embodiment of the third aspect.

FIG. 20 shows a third embodiment of the third aspect of the invention.

In FIG. 20 a motor M is connected to a direct current DC and rotationally driven, with the switching on of a switch SW$_1$. A rotation judgement circuit PRC" which takes a detection output from a rotation sensor 40 for detecting motor M rotating/stopped conditions, and judges the rotation or non-rotation, has the same construction as the device in FIG. 11. Moreover, with regards to a pickup coil which constitutes a transducer coil of the rotation sensor 40, this can be constructed from a single coil as shown in FIG. 11, or as two coils as shown in FIG. 17.

A first AND gate 50 has two input terminals "a", "b", with a direct current power source (in the case of alternating current power source, a rectifying circuit can be inserted between a switch SW$_2$ and the input terminal "a" of the AND gate 50, with the voltage dropped with a transformer or the like) connected to the input terminal "a" side via a switch SW$_2$ linked to the switch SW$_1$. The rectified output from a rectifying circuit REC 3 (to be described hereunder) is input to the input terminal "b". The first AND gate 50 has a fail-safe construction such that when an input signal of a higher level than a preset threshold value is input to the two input terminals "a""b", it generates an output of logic value "1". This type of fail-safe AND gate uses the window comparator of FIG. 2, and can be constructed by setting the upper limit threshold values of the two input terminals to a sufficiently high level. Such a fail safe AND gate which uses a window comparator is disclosed for example in U.S. Pat. No. 4,661,880.

The third rectifying circuit REC 3 comprises two capacitors C51, C52, and two diodes D51, D52, with the amplified output from an amplifier AMP inside the rotation judgement circuit PRC" input via a resistor R60 and a four terminal capacitor C60. The capacitor C60 is for filtering the output component of a high frequency signal generator 2 inside the rotation judgement circuit PRC", thus constituting a filter circuit, while the resistor R60 is inserted so that the capacitor C60 does not influence a rectifying circuit REC 2 inside the rotation judgement circuit PRC".

The operation will now be described.

When the switch SW$_1$ is switched on so that the motor M rotates, then the detection output from the rotation sensor 40 changes periodically with the passing of the recesses/ protrusion on the metal rotation body Rot, and is input to the rotation judgement circuit PRC". The amplifier AMP amplifies this change and outputs, and hence the rectified output from the rectifying circuit REC 3 becomes higher than the threshold value of the input terminal "a" of the first AND gate 50. Since the switch SW$_2$ linked to the switching on of the switch SW$_2$ is on, then there is input to the input terminal "a" of the first AND gate 50 an input signal of a higher level than the threshold value of the input terminal "a". Hence due to the input of the output signal from the rectifying circuit REC 3, the output signal from the first AND gate 50 becomes a logic value "1". The output signal of logic value "1" from the first AND gate 50 can for example be displayed as a motor M operation continuation permit signal. On the other hand, when the motor M is stopped by switching off the switch SW$_1$, the output signal from the first AND gate 50 becomes a logic value "0", so that the operation continuation permit signal is cancelled and operation can be stopped immediately. Here a motor operation permit signal generating circuit comprises the first AND gate 50, the rectifying circuit REC 3 and the capacitor C$_{60}$. This motor operation permit signal generating circuit corresponds to the fourth aspect of the invention.

With such a construction, under conditions wherein the pickup coil L in the rotation sensor 40 is not close to the metal rotation body Rot so that the rotation of the metal rotation body Rot cannot be monitored, then a signal of a higher level than the threshold value of the input terminal "b" of the first AND gate 50 is not generated from the rectifying circuit REC 3, and the output signal from the first AND gate 50 thus becomes a logic value "0". Hence the motor M operation continuation permit signal is cancelled, so that the motor M can be stopped.

Consequently in the case wherein a fault occurs, with the pickup coil L becoming detached from the metal mount 31, so that motor M rotation detection becomes impossible, then the motor M can be stopped immediately.

Incidentally, with industrial equipment, the use of machines which operate with continuous rotation is common. When detecting the rotation or rotation of such a rotating machine, then the output of logic value "0" indicating the rotating condition, is continuous. On the other hand, since the construction is fail-safe, then in the case of a fault in the rotation sensor etc., the output from the rotation judgement circuit PRC" becomes zero. Consequently, under conditions wherein the movable part is rotating, if a fault occurs for example in the pickup coil L, then it is not possible to know this until the movable part has stopped.

With the apparatus of this embodiment, since the operation continuation permit signal from the first AND gate 50 is cancelled at the point in time when the pickup coil L faults, it has the effect of being able to give an immediate warning in the case of a fault.

Figure 21:
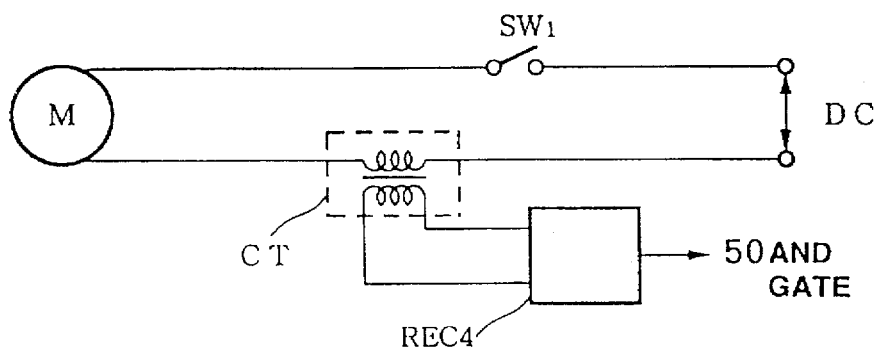
FIG. 21 is a circuit diagram of the main components of a fourth embodiment of the third aspect.

In FIG. 20, the power supply signal to the motor M is input to the input terminal "a" of the first AND gate 50 via the switch $SW_2$. However a construction as shown in FIG. 21 for a fourth embodiment, with a current transformer CT disposed in the feeder line to the motor M, and an output from the current transformer CT rectified by a rectifier REC 4 and input to the input terminal "a" of the first AND gate 50, is also possible.

Figure 22:
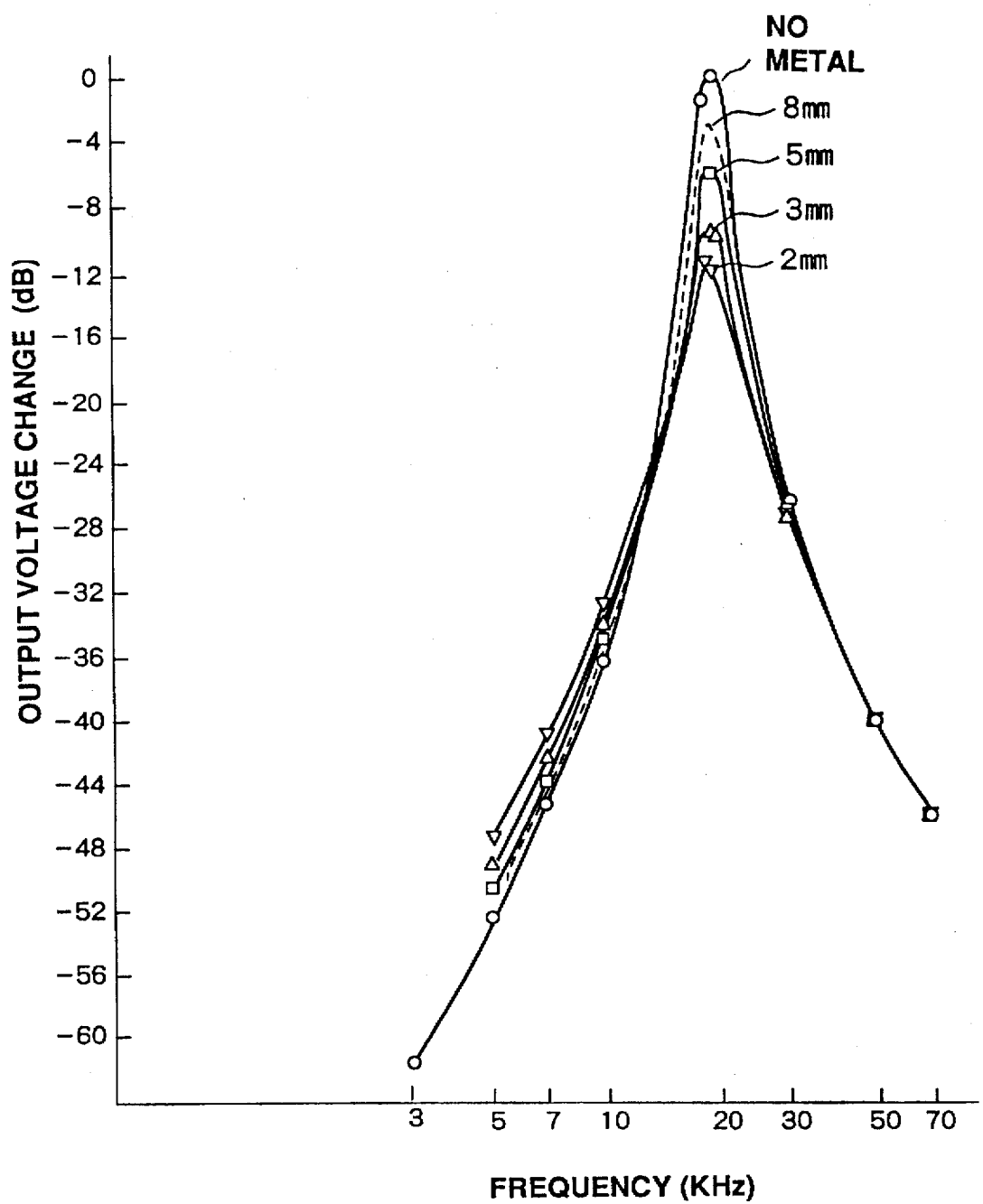
FIG. 22 is a diagram showing measurement data for the attenuation characteristics of the sensor output with change in distance between the transducer coil and the metal rotation body.
Figure 23A:
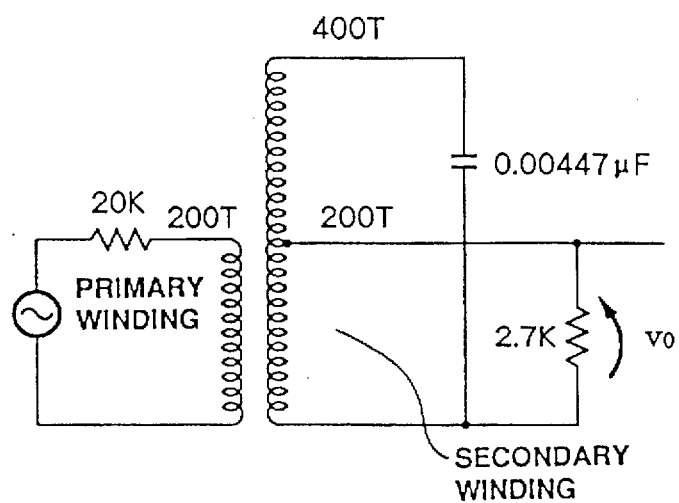
FIGS. 23(A) and 23(B) show the construction of the rotation sensor used in the measurements of FIG. 22, with FIG. 23(A) showing the rotation sensor circuit diagram and FIG. 23(B) showing the coil housing structure.
Figure 23B:
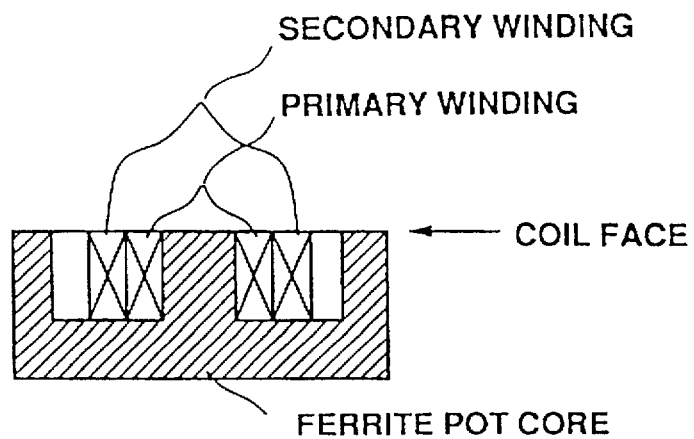

FIG. 22 shows measurement results for secondary side output voltage attenuation characteristics when a distance W between a piece of steel (S10C) and the coil face is changed using a rotation sensor having the circuit structure and the coil housing structure as shown respectively in FIGS. 23(A), and 23(B).

If the output voltages $e_1$, $e_2$, $e_3$ of FIG. 13 respectively correspond to the distances 2mm (=W1) 5mm (=W2) and no steel (W =∞), then from FIG. 22 it can be seen that the setting of the upper limit threshold value ThAH of the window comparator 3 involves rather delicate adjustment.

FIG. 24 shows an effective attachment arrangement for the coil housing case 30.

In FIG. 24, a printed circuit board 31A is secured by means of several screws 31a, to the metal mount 31 which is provided integral with the motor drive apparatus side and located close to the metal rotation body. The coil housing case 30 of synthetic resin with the pickup coil L moulded therein, is secured on top of the printed circuit board 31A by means of attachment screws 30a. The pickup coil L is connected to the wiring of the printed circuit board 31A via the attachment screw portion so as to be electrically connected to the circuit elements inside the accessories housing case CS.

With such an attachment arrangement, then in a worst case scenario wherein a sideways forces acts on the coil housing case 30 so that the coil housing case 30 is tilted, then the force due to this tilting acts directly on the printed circuit board 31A via the screws 30a, producing a strain. A disconnection fault thus occurs in the wiring (for example copper foil) of the printed circuit board 31A, or if the displacement of the coil housing case 30 is significant, the coil housing case 30 comes away from the printed circuit board 31A.

Figure 25:
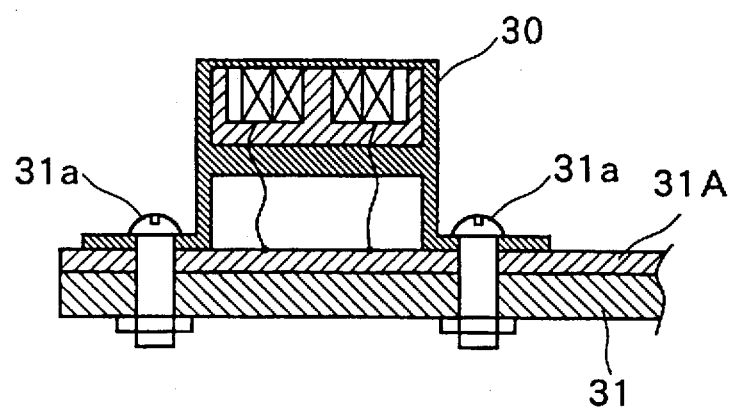
FIG. 25 shows an undesirable example of an attachment arrangement of the transducer coil.

On the other hand, with an attachment arrangement shown in FIG. 25, the coil housing case 30 is secured to the metal mount 31 and not to the printed circuit board 31A, and the lead wires from the pickup coil are connected directly to the printed circuit board 31A.

Figure 26:
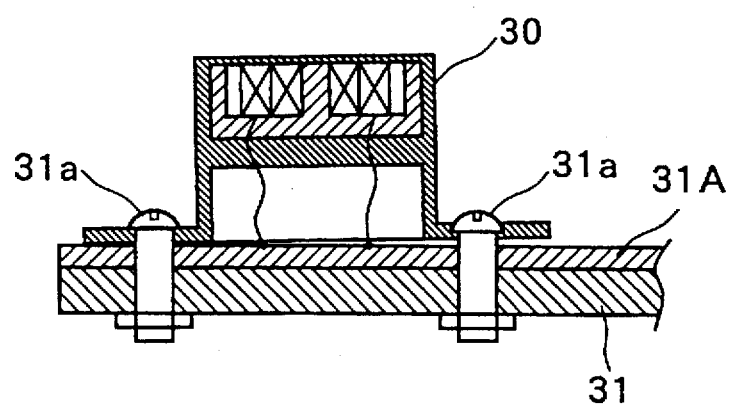
FIG. 26 is a diagram showing a displaced condition of the coil housing case.

With this construction, since the coil housing case 30 is secured to the metal mount 31, then this is more rugged compared to the attachment arrangement of FIG. 24. Therefore, when a sideways force acts on the coil housing case 30 so that the coil housing case 30 is tilted as shown in FIG. 26, since this force is taken by the metal mount 31, the influence therefrom has practically no effect on the printed circuit board 31A and the lead wires, so that disconnection in the wiring in the printed circuit board 31A or of the lead wires is unlikely.

Consequently, the attachment arrangement of FIG. 24 is adopted with the pickup coil being easily disconnected when an external force acts on the coil housing case 30. Hence when the coil housing case 30 is displaced from its established position with the application of an external force thereon, the coil becomes disconnected and the output drops. Therefore if poor quality interference is not considered, only the lower limit threshold value need be set. Hence the upper limit threshold value setting which requires delicate adjustment, can be made redundant.

In practice, when an external force acts on the coil housing case 30 which is attached close to the metal rotation body, the coil housing case 30 is displaced in the upward direction, that is to say, in the direction wherein the pickup coil approaches the metal rotation body, so that the distance W is shortened. In this case, since a fluctuation in the output signal still occurs with passing of the recesses/protrusions of the metal rotation body, then provided there is no fault in the rotation sensor, the motor rotation can always be detected. However, although the motor rotation can be detected, the situation of the pickup coil approaching the metal rotation body is not normal. Therefore, if for example the distance between the pickup coil and the protrusions on the metal rotation body is set to 2mm, the lower limit threshold value can be set to an output signal level corresponding for example to W =1mm. Therefore, when closer than this, an operation continuation prohibit signal can be generated.

However, if when the coil housing case is lifted this results in an electrical disconnection condition, then there is no longer the above requirement.

Figure 27:
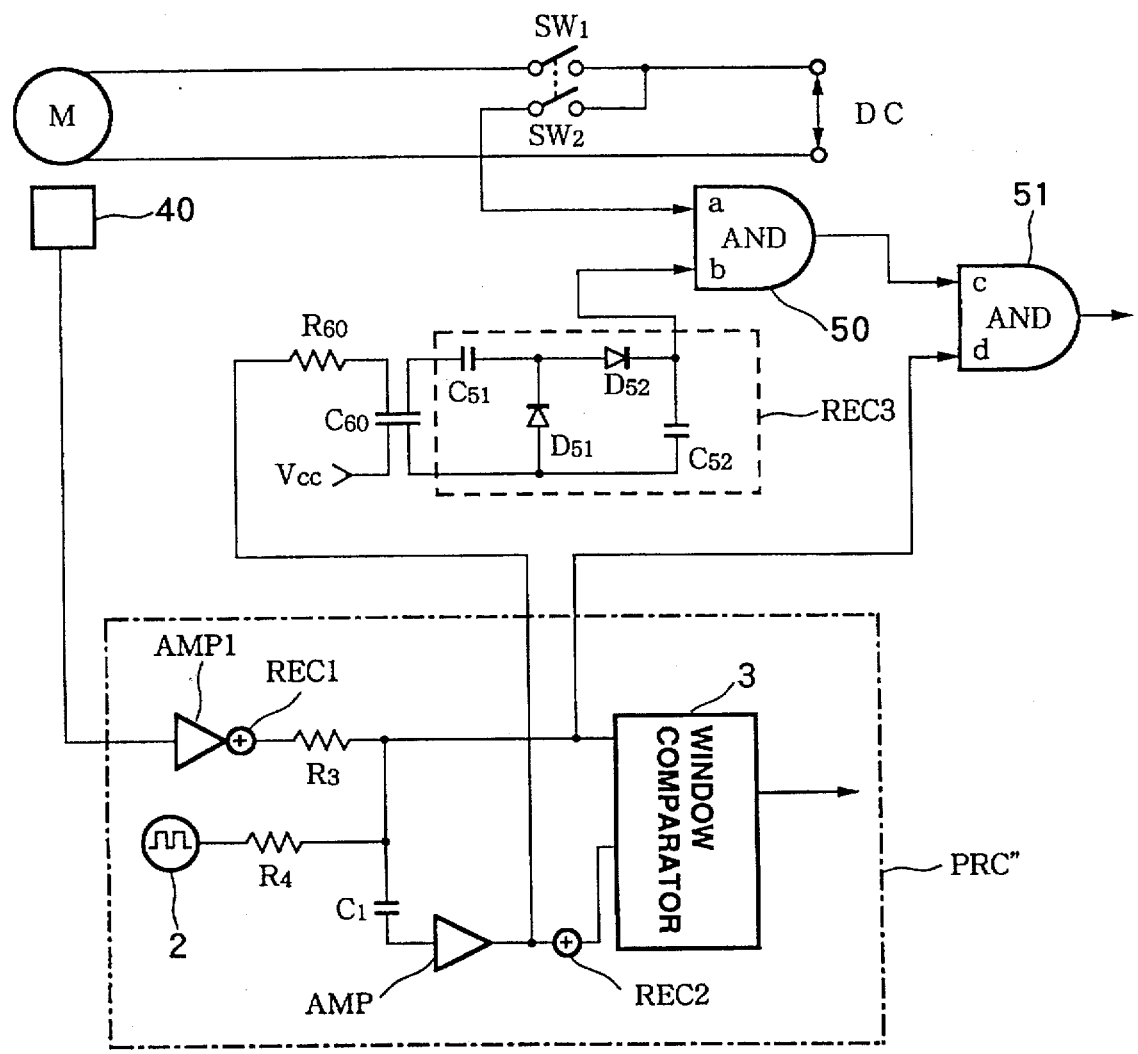
FIG. 27 is a circuit diagram of a fifth embodiment of the third aspect of the invention.

A fifth embodiment is shown in FIG. 27.

In FIG. 27, with this embodiment, a second AND gate 51 is provided in addition to the arrangement of FIG. 20, which takes the output signal from the first AND gate 50, and the output signal from the rectifying circuit REC 1 inside the rotation judgement circuit PRC", with the construction such that an output signal of logic value "1" from the second AND gate 51 is made the operation continuation permit signal. Consequently with this embodiment, the motor operation permit signal generating circuit comprises the second AND gate 51 in addition to the first AND gate 50, the rectifying circuit REC 3 and the capacitor C60.

With the second AND gate 51, for the input levels of the input terminal "c", the lower limit threshold value only can be set, and the upper limit threshold value set to a sufficiently high level. For the input level of the input terminal "d", the lower limit threshold value can be set so that the output from the rectifying circuit REC 1 when the rotation sensor 40 is closer than a pre-set distance W, falls outside of the threshold value range.

This embodiment monitors for both rotation sensor 40 detachment, and abnormal approach of the rotation sensor 40. More specifically, if the rotation sensor 40 becomes detached, a change in the output from the rotation sensor 40 with rotation of the motor M is not produced so that the input signal level of the input terminal "b" of the first AND gate 50 drops. The output signal from the first AND gate 50 thus becomes a logic value "0" and the output signal from the second AND gate 51 becomes a logic value "0" so that the operation continuation permit signal stops. Furthermore, when the pickup coil of the rotation sensor 40 becomes closer than a pre-set distance to the metal rotation body which rotates as one with the motor M, then the input level of the input terminal "d" of the second AND gate 51 becomes lower than the threshold value. The output signal from the second AND gate 51 thus becomes a logic value "0" so that the operation continuation permit signal stops.

Furthermore, as with the circuit of FIG. 20 since the operation continuation permit signal from the first AND gate 50 is cancelled at the point in time when the pickup coil L faults, then when a fault occurs the circuit of the present embodiment has the effect of being able to give an immediate warning of the fault, even when applied to mechanical equipment where the rotating part seldom stops.

When an upper limit threshold value is set on the input terminal "d" side of the second AND gate 51, and the pickup coil is connected to the amplifier AMP 1 but not via the accessories housing case CS shown in FIG. 19, then if the construction is such that with a rise in the output signal level, the input signal level of the input terminal "d" exceeds the upper limit threshold value so that the output signal from the second AND gate 51 becomes a logic value "0", then monitoring for normal or abnormal connection of the rotation sensor 40 is also possible. Moreover, in addition to monitoring for detachment of the coil housing case or its abnormal approach, it is also possible to monitor for erroneous circuit connections.

Figure 28:
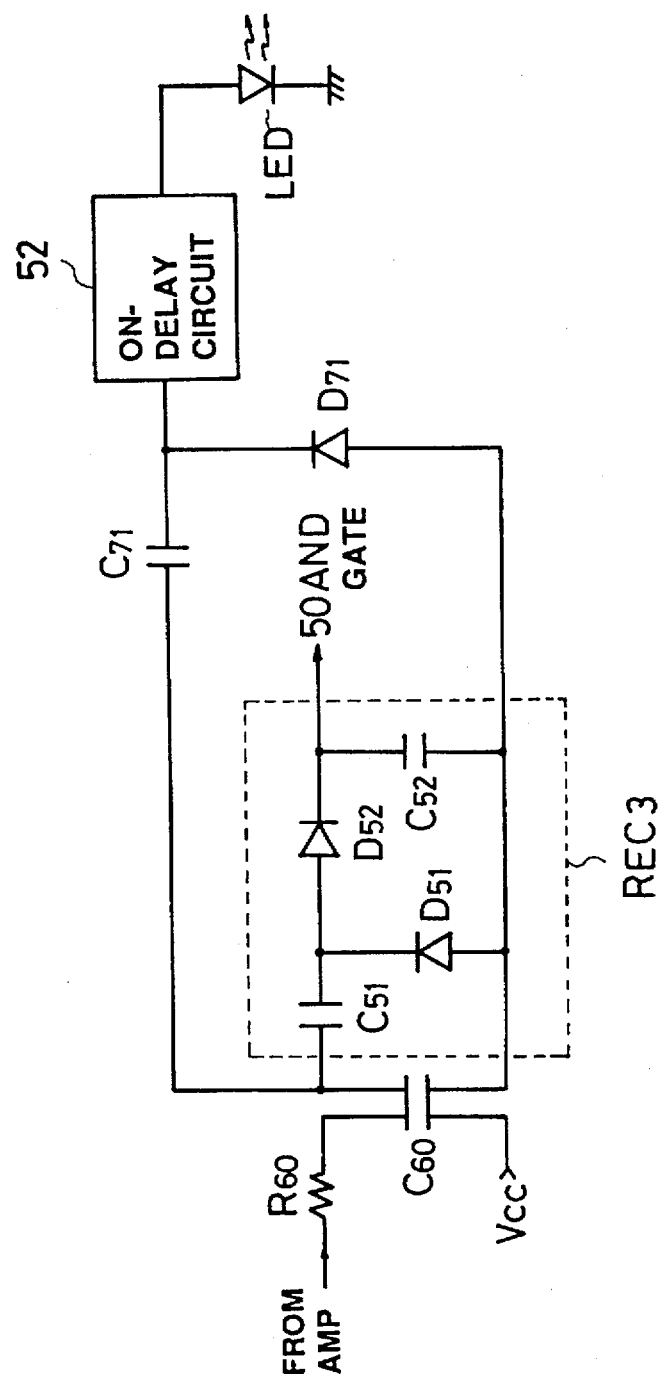
FIG. 28 is a circuit diagram of the main components of a sixth embodiment of the third aspect of the invention.

With the respective embodiments shown in FIG. 20 and FIG. 27, the circuit of FIG. 28 can be added thereto.

In FIG. 28 an on-delay circuit 52 is connected via a coupling capacitor C71 to the output side of a filter circuit comprising a capacitor C60 for filtering the output from the second amplifier AMP of the rotation judgement circuit PRC", and a light emitting diode LED is connected to the output side of the on-delay circuit 52. The diode D52 is a clamping diode for clamping the output from the capacitor C52 at the power source potential Vcc.

Figure 29:
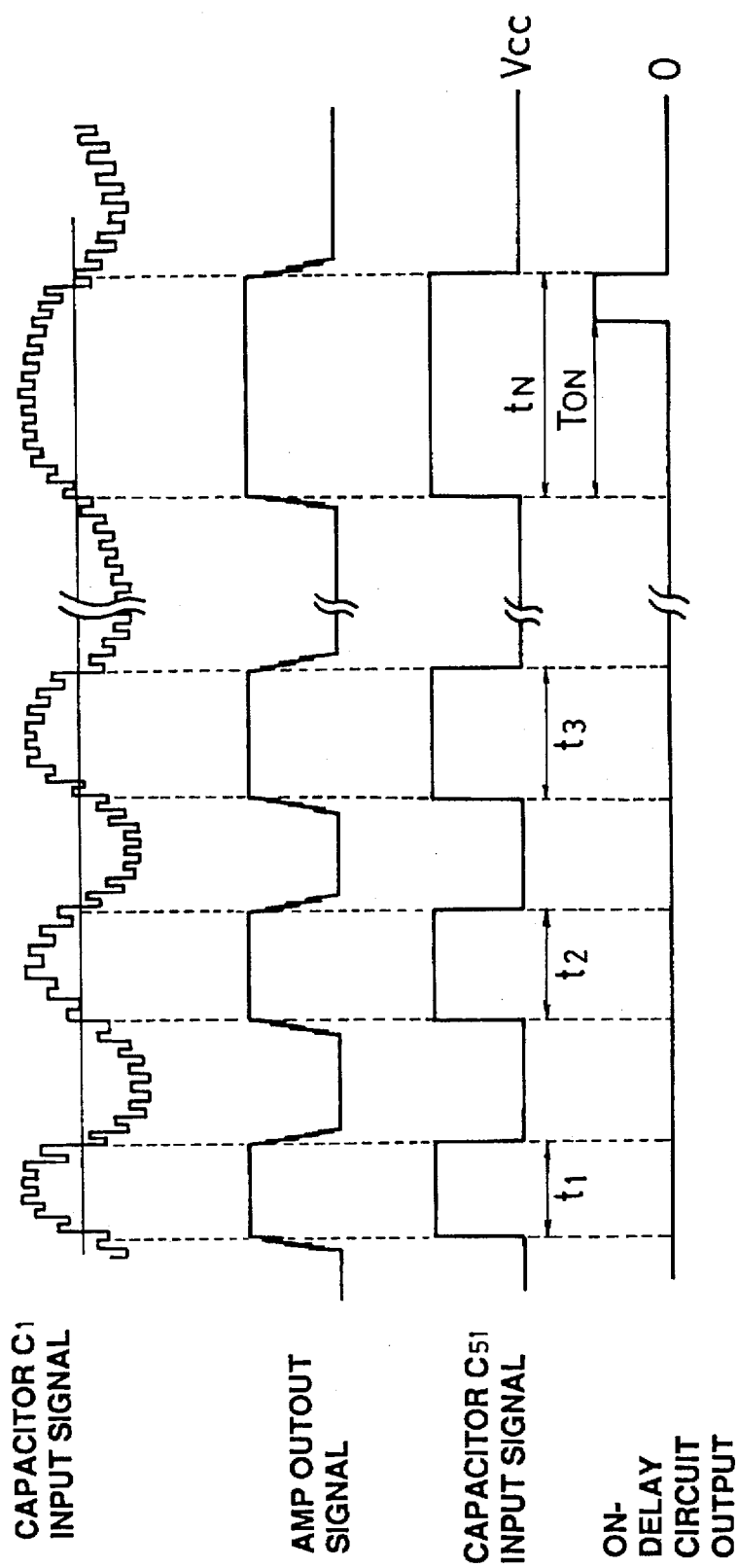
FIG. 29 is a time chart for explaining the operation of the circuit of FIG. 28.

With such a construction, as shown by the time chart of FIG. 29, the frequency of the output from the capacitor C1 inside the rotation judgement circuit PRC" changes correspondingly to the drop in the rotational speed of the motor M. As a result, the input signal (output signal from the capacitor C60) to the amplifier AMP and to the capacitor C51 inside the third rectifying circuit REC 3 also changes. That is, when the rotation of the motor M drops, then the pulse widths $t1_1$, $t_2$....... $t_N$ of the input signals to capacitor C51 lengthens correspondingly. Furthermore, when the pulse widths becomes longer than a previously set delay time interval $T_{On}$ of the on-delay circuit 52, an output signal of logic value "1" is generated from the on-delay circuit 52 so that the LED comes on. Consequently, the LED can be made to flash when the rotational speed of the motor M falls below a predetermined speed (determined by the delay time of the on-delay circuit 52)..

With such a construction, the fact that the motor M has slowed to a rotational speed which is safe for the operator to be close, can be shown by the flashing of the LED. Hence equipment inspection and the like can be carried out while the motor is rotating.

The motor operation permit signal generating circuits of FIG. 20 and FIG. 27 and the construction wherein the circuit of FIG. 28 is added to these circuits can, needless to say, be applied to the case where a rotation sensor utilizing a tachometer generator as shown for example in FIG. 1 and FIG. 5 is used, or to the case where a rotation sensor utilizing an oscillator as shown in FIG. 9 is used. Furthermore, these can also be applied to the device disclosed in PCT/JP93/ 00411 where a rotation sensor utilizing a bridge circuit is used.

With the first aspect of the invention as described above, since this is constructed to sample the motor rotation signal using the output signal from the tachometer generator, then adjustment of the rotation sensor is not required even with a change in the motor (detection object). Furthermore, with the second aspect of the invention, since this is constructed with the transducer coil inserted into a part of the oscillator, and the motor rotation signal sampled by converting motor rotation into a change in oscillation frequency, then only phase adjustment of the oscillator side is required with no requirement for adjustment of the rotation sensor side, even with a change in the motor (detection object). Furthermore, with the first and second aspects of the invention, since the output level from the rotation sensor can be increased, it is not necessary to provide an amplifier for amplifying the output signal from the rotation sensor. It is therefore not necessary to consider the problem attributable to a double fault with the rotation sensor and the amplifier faulting at the same time.

Moreover, with the third aspect of the invention, since this is constructed with the change in the terminal voltage of the resonance circuit of the transducer coil and the capacitor sampled as the motor rotation signal, then adjustment of the rotation sensor is not required even with a change in the motor (detection object). Moreover, since the rise in the output level at the time of a rotation sensor fault can be kept small, even in the case where an amplifier is provided for amplifying the output signal from the rotation sensor, then fail-safe characteristics can be maintained at the time of a simultaneous fault with the amplifier.

Consequently, the circuit construction is simpler than for the conventional technology where the rotation signal of the motor is sampled using the imbalance output signal from a bridge circuit, thus facilitating maintenance of the apparatus, and resulting in a device with excellent fail-safe characteristics.

INDUSTRIAL APPLICABILITY

In cases with industrial machinery and the like requiring a high degree of safety, where a load is driven by a motor, the present invention enables simple handling of the machinery while maintaining a high degree of safety, and hence has considerable industrial applicability.

We claim:

1. A motor stopped verification apparatus comprising; a rotation sensor which produces an output signal corresponding to a motor rotating or stopped condition, a fail-safe rotation judgement circuit which generates an output of logic value "1" under the motor stopped condition and an output of logic value "0" under the motor rotating condition, based on an output signal from the rotation sensor, and which generates an output of logic value "0" at the time of a fault, said rotation judgement circuit including a first rectifying circuit into which an alternating current signal produced from the rotation sensor corresponding to the motor rotating or stopped condition is input and rectified, a high frequency signal generating device for generating a high frequency signal for being superimposed on an output signal from the first rectifying circuit, an amplifying device which amplifies said output signal which has been superimposed with the high frequency signal and is saturated at the level of the rotation sensor output signal for when the motor is rotating, a capacitor interposed between the high frequency signal generating device and the amplifying device, for transmitting the output signal from the first rectifying circuit which has been superimposed with the high frequency signal to the amplifying device, a second rectifying circuit for rectifying the output from the amplifying device, and a two input window comparator having a first input terminal for direct input of the output signal from the first rectifying circuit which has been superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein said rotation sensor is constructed such that a high frequency current signal is supplied to the windings of a tachometer generator incorporated in the motor, and modulated by an output signal from the tachometer generator, and the modulated signal is transmitted to said rotation judgement circuit as the output signal corresponding to the motor rotating or stopped condition.

2. A motor stopped verification apparatus according to claim 1, wherein said rotation sensor comprises; an alternating current signal generating device for generating a high frequency alternating current signal, a first transformer with a secondary winding connected in series to a tachometer generator winding, and a primary winding connected to said alternating current signal generating device, and a current-voltage conversion device for converting a current signal flowing in the series circuit of the secondary winding of the first transformer and the winding of the tachometer generator, into a voltage signal, and transmitting this to the rotation judgement circuit.

3. A motor stopped verification apparatus according to claim 2, wherein said current-voltage conversion device is a resistance element inserted in series in the series circuit of the windings of the first transformer and the tachometer generator.

4. A motor stopped verification apparatus according to claim 2, wherein said current-voltage conversion device comprises a second transformer with a primary winding inserted in series in the series circuit of the windings of the first transformer and the tachometer generator, and with an output signal from a secondary winding input to the rotation judgement circuit.

5. A motor stopped verification apparatus according to claim 4, wherein said rotation judgement circuit is provided with a fail-safe on-delay circuit which delays the output from the two input window comparator by a predetermined delay time before output, and which does not erroneously shorten the delay time at the time of a fault.

6. A motor stopped verification apparatus comprising; a rotation sensor which produces an output signal corresponding to a motor rotating or stopped condition, a fail-safe rotation judgement circuit which generates an output of logic value "1" under the motor stopped condition and an output of logic value "0" under the motor rotating condition, based on an output signal from the rotation sensor, and which generates an output of logic value "0" at the time of a fault, said rotation judgement circuit including a first rectifying circuit into which an alternating current signal produced from the rotation sensor corresponding to the motor rotating or stopped condition is input and rectified, a high frequency signal generating device for generating a high frequency signal for being superimposed on an output signal from the first rectifying circuit, an amplifying device which amplifies said output signal which has been superimposed with the high frequency signal and is saturated at the level of the rotation sensor output signal for when the motor is rotating, a capacitor interposed between the high frequency signal generating device and the amplifying device, for transmitting the output signal from the first rectifying circuit which has been superimposed with the high frequency signal to the amplifying device, a second rectifying circuit for rectifying the output from the amplifying device, and a two input window comparator having a first input terminal for direct input of the output signal from the first rectifying circuit which has been superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein said rotation sensor comprises; a coil with an inductance which changes in accordance with the rotation or non-rotation of the motor, an oscillating circuit including said coil and a capacitor constituting a resonance circuit wherein the oscillation frequency changes in accordance with the change in inductance of the coil, and a frequency-voltage converting circuit for converting the frequency of the oscillating circuit into a voltage, and transmitting this to the rotation judgement circuit.

7. A motor stopped verification apparatus comprising; a rotation sensor which produces an output signal corresponding to a motor rotating or stopped condition, a fail-safe rotation judgement circuit which generates an output of logic value "1" under the motor stopped condition and an output of logic value "0" under the motor rotating condition, based on an output signal from the rotation sensor, and which generates an output of logic value "0" at the time of a fault, said rotation judgement circuit including a first amplifying device for amplifying the alternating current signal produced from the rotation sensor corresponding to the motor rotating or stopped condition, a first rectifying circuit for rectifying the amplified output from said first amplifying device, a high frequency signal generating device for generating a high frequency signal for being superimposed on an output signal from the first rectifying circuit, a second amplifying device which amplifies said output signal superimposed with the high frequency signal and is saturated at the level of the rotation sensor output signal for when the motor is rotating, a capacitor interposed between the high frequency signal generating device and the second amplifying device, for transmitting the output signal from the first rectifying circuit which has been superimposed with the high frequency signal to the second amplifying device, a second rectifying circuit for rectifying the output from the second amplifying device, and a two input window comparator having a first input terminal for direct input of the output signal from the first rectifying circuit which is superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein said rotation sensor has a resonance circuit comprising a capacitor and a transducer coil with an inductance which changes in accordance with the rotation or non-rotation of motor, and an alternating current signal generating device for supplying an alternating current signal to said resonance circuit, and is constructed such that a terminal voltage signal of the resonance circuit which changes with rotation of the motor is transmitted to said rotation judgement circuit as the output signal corresponding to the motor rotating or stopped condition.

8. A motor stopped verification apparatus according to claim 7, wherein said transducer coil is housed in a coil housing case secured to an attachment member located close to a metal rotation body driven by a motor, and located so as to face at a predetermined distance, recesses/protrusions formed at even spacing around the periphery of said metal rotation body.

9. A motor stopped verification apparatus according to claim 8, wherein at least one of the signal transmitting elements other than the transducer coil constituting the rotation sensor is housed in a different housing case to said coil housing case to be secured to said attachment member.

10. A motor stopped verification apparatus according to claim 8, wherein said transducer coil comprises a primary coil which transmits an alternating current signal supplied from said alternating current signal generator, and a secondary coil which receives the transmission signal from said primary coil.

11. A motor stopped verification apparatus according to claim 10, wherein a low pass filter is provided between said rotation sensor and said rotation judgement circuit.

12. A motor stopped verification apparatus according to claim 7, wherein a motor operation permit signal generating circuit is provided comprising a filter circuit for taking the output signal from the second amplifying device of said rotation judgement circuit, and eliminating the high frequency signal component which has been superimposed with said output signal, a third rectifying circuit for rectifying the output from the filter circuit, and a fail safe first AND gate with the electrical signal to said motor input to one input terminal and the rectified output from the third rectifying circuit input to the other input terminal, which generates an output of logic value "1" when the input signal levels of both input terminals are both higher than a predetermined threshold value and which gives an output of logic value "0" at the time of a fault, with the output signal of logic value "1" from the first AND gate made a motor operation continuation permit signal.

13. A motor stopped verification apparatus according to claim 12, wherein an on-delay circuit having a predetermined delay time is connected to the output side of said filter circuit, with an output signal of logic value "1" from the on-delay circuit made a rotation decreased signal.

14. A motor stopped verification apparatus according to claim 7, wherein a motor operation permit signal generating circuit is provided comprising; a filter circuit for taking the output signal from the second amplifying device of said rotation judgement circuit, and eliminating the high frequency signal component which has been superimposed with said output signal, a third rectifying circuit for rectifying the output from the filter circuit, a fail safe first AND gate with the electrical signal to said motor input to one input terminal and the rectified output from the third rectifying circuit input to the other input terminal, which generates an output of logic value "1" when the input signal levels of both input terminals are both higher than a predetermined threshold value and which gives an output of logic value "0" at the time of a fault, and a fail safe second AND gate with the output signal from said first AND gate input to one input terminal and the output signal from the first rectifying circuit of said rotation judgement circuit input to the other input terminal, which generates an output of logic value "1" when the input signal levels of both input terminals are both higher than a predetermined threshold value and which gives an output of logic value "0" at the time of a fault, with the output signal of logic value "1" from the second AND gate made a motor operation continuation permit signal.

15. A motor stopped verification apparatus according to claim 14, wherein an on-delay circuit having a predetermined delay time is connected to the output side of said filter circuit, with an output signal of logic value "1" from the on-delay circuit made a rotation decreased signal.

16. A motor stopped verification apparatus comprising; a rotation sensor which produces an output signal corresponding to the motor rotating or stopped condition, a fail-safe rotation judgement circuit which generates an output of logic value "1" under the motor stopped condition and an output of logic value "0" under the motor rotating condition, based on an output signal from the rotation sensor, and which generates an output of logic value "0" at the time of a fault, said rotation judgement circuit including a first rectifying circuit into which an alternating current signal produced from the rotation sensor corresponding to the motor rotating or stopped condition is input and rectified, a high frequency signal generating device for generating a high frequency signal for being superimposed on an output signal from the first rectifying circuit, an amplifying device which amplifies said output signal which has been superimposed with the high frequency signal and is saturated at the level of the rotation sensor output signal for when the motor is rotating, a capacitor interposed between the high frequency signal generating device and the amplifying device, for transmitting the output signal of the first rectifying circuit which has been superimposed with the high frequency signal to the amplifying device, a second rectifying circuit for rectifying the output from the amplifying device, and a two input window comparator having a first input terminal for direct input of the output signal from the first rectifying circuit which has been superimposed with the high frequency signal, and a second input terminal for input of the rectified output from the second rectifying circuit, which generates a motor stopped judgement output of logic value "1", only when the levels of both signals input to the first input terminal and to the second input terminal are simultaneously within predetermined threshold value ranges determined by an upper limit value and a lower limit value pre-set for each input terminal, the respective threshold value ranges of the first and second input terminals being set so that the level of the signal input to the first input terminal is outside the threshold value range when the sensor is faulty, and the level of the signal input to the second input terminal is outside the threshold value range when the motor is rotating, wherein a motor operation permit signal generating circuit is provided comprising; a filter circuit for taking the output signal from the amplifying device of said rotation judgement circuit, and eliminating the high frequency signal component which has been superimposed with said output signal, a third rectifying circuit for rectifying the output from the filter circuit, and a fail safe first AND gate with the electrical signal to said motor input to one input terminal and the rectified output from the third rectifying circuit input to the other input terminal, which generates an output of logic value "1" when the input signal levels of both input terminals are both higher than a predetermined threshold value and which gives an output of logic value "0" at the time of a fault, with the output signal of logic value "1" from the first AND gate made a motor operation continuation permit signal.

* * * * *